(12) United States Patent
Rowe et al.

(10) Patent No.: US 12,234,811 B1
(45) Date of Patent: Feb. 25, 2025

(54) MONITORING A STATE OF A SHAPE MEMORY MATERIAL MEMBER

(71) Applicant: Toyota Motor Engineering & Manufacturing North America, Inc., Plano, TX (US)

(72) Inventors: Michael Paul Rowe, Pinckney, MI (US); Brian J. Pinkelman, Ann Arbor, MI (US); Yufei Zhu, Ypsilanti, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/452,602

(22) Filed: Aug. 21, 2023

(51) Int. Cl.
*F03G 7/06* (2006.01)
*G01L 1/22* (2006.01)
*G01L 5/00* (2006.01)

(52) U.S. Cl.
CPC ......... *F03G 7/066* (2021.08); *F03G 7/06143* (2021.08); *G01L 1/22* (2013.01); *G01L 5/0061* (2013.01)

(58) Field of Classification Search
CPC ....... F03G 7/066; F03G 7/06143; G01L 1/22; G01L 5/0061
See application file for complete search history.

(56) References Cited

U.S. PATENT DOCUMENTS

| | | |
|---|---|---|
| 1,658,669 A | 2/1928 | Cohn et al. |
| 2,322,755 A | 6/1943 | Voorhies |
| 2,588,706 A | 3/1952 | Davis |
| 3,394,631 A | 7/1968 | Thompson |
| 3,706,102 A | 12/1972 | Grenier |
| 4,063,826 A | 12/1977 | Riepe |
| 4,244,140 A | 1/1981 | Kim |
| 4,396,220 A | 8/1983 | Dieckmann et al. |
| 4,498,851 A | 2/1985 | Kolm et al. |
| 4,522,447 A | 6/1985 | Snyder et al. |
| 4,541,885 A | 9/1985 | Caudill, Jr. |

(Continued)

FOREIGN PATENT DOCUMENTS

| | | |
|---|---|---|
| CN | 201037277 | 3/2008 |
| CN | 101367433 A | 2/2009 |

(Continued)

OTHER PUBLICATIONS

Zhu et al., U.S. Appl. No. 18/172,637, filed Feb. 22, 2023.

(Continued)

*Primary Examiner* — Shafiq Mian

(74) *Attorney, Agent, or Firm* — Christopher G. Darrow; Darrow Mustafa PC

(57) ABSTRACT

A state of a shape memory material member in an actuator can be monitored and controlled to protect the shape memory material member. When activated, the actuator can be configured to morph into an activated configuration in which a dimension (e.g., the height) of the actuator increases. A sensor configured to acquire sensor data. A portion of the shape memory material member can operatively engaging the sensor. One or more processors can be operatively connected to monitor a state of the shape memory material member based on the sensor data.

18 Claims, 9 Drawing Sheets

(56) References Cited

U.S. PATENT DOCUMENTS

| | | |
|---|---|---|
| 4,544,988 A | 10/1985 | Hochstein |
| 4,553,393 A | 11/1985 | Ruoff |
| 4,595,338 A | 6/1986 | Kolm et al. |
| 4,779,852 A | 10/1988 | Wassell |
| 4,780,062 A | 10/1988 | Yamada et al. |
| 4,806,815 A | 2/1989 | Homma |
| 4,811,564 A | 3/1989 | Palmer |
| 4,834,619 A | 5/1989 | Walton |
| 4,898,426 A | 2/1990 | Schulz et al. |
| 4,923,000 A | 5/1990 | Nelson |
| 4,944,755 A | 7/1990 | Hennequin et al. |
| 4,955,196 A | 9/1990 | Lin et al. |
| 4,964,402 A | 10/1990 | Grim et al. |
| 5,069,219 A | 12/1991 | Knoblich |
| 5,088,115 A | 2/1992 | Napolitano |
| 5,129,753 A | 7/1992 | Wesley et al. |
| 5,250,167 A | 10/1993 | Adolf et al. |
| 5,255,390 A | 10/1993 | Gross et al. |
| 5,279,123 A | 1/1994 | Wechsler et al. |
| 5,482,351 A | 1/1996 | Young et al. |
| 5,488,255 A | 1/1996 | Sato et al. |
| 5,522,712 A | 6/1996 | Winn |
| 5,583,844 A | 12/1996 | Wolf et al. |
| 5,619,177 A | 4/1997 | Johnson et al. |
| 5,622,482 A | 4/1997 | Lee |
| 5,662,376 A | 9/1997 | Breuer et al. |
| 5,678,247 A | 10/1997 | Vickers |
| 5,686,003 A | 11/1997 | Ingram et al. |
| 5,747,140 A | 5/1998 | Heerklotz |
| 5,771,742 A | 6/1998 | Bokaie et al. |
| 5,846,629 A | 12/1998 | Gwinn |
| 5,853,005 A | 12/1998 | Scanlon |
| 5,861,703 A | 1/1999 | Losinski |
| 6,043,978 A | 3/2000 | Mody et al. |
| 6,053,553 A | 4/2000 | Hespelt |
| 6,093,910 A | 7/2000 | McClintock et al. |
| 6,116,257 A | 9/2000 | Yokota et al. |
| 6,142,563 A | 11/2000 | Townsend et al. |
| 6,155,716 A | 12/2000 | Okamura |
| 6,186,047 B1 | 2/2001 | Baruffaldi |
| 6,227,515 B1 | 5/2001 | Broyles |
| 6,379,393 B1 | 4/2002 | Mavroidis et al. |
| 6,394,001 B1 | 5/2002 | Giesey et al. |
| 6,404,098 B1 | 6/2002 | Kayama et al. |
| 6,422,010 B1 | 7/2002 | Julien |
| 6,443,524 B1 | 9/2002 | Yu |
| 6,481,799 B1 | 11/2002 | Whalen |
| 6,508,437 B1 | 1/2003 | Davis et al. |
| 6,530,217 B1 | 3/2003 | Yokota et al. |
| 6,546,806 B1 | 4/2003 | Varma |
| 6,591,188 B1 | 7/2003 | Ohler |
| 6,628,522 B2 | 9/2003 | Trautman et al. |
| 6,664,718 B2 | 12/2003 | Perline et al. |
| 6,719,694 B2 | 4/2004 | Weng et al. |
| 6,740,994 B2 | 5/2004 | Lee et al. |
| 6,773,535 B1 | 8/2004 | Wetzel |
| 6,809,462 B2 | 10/2004 | Pelrine et al. |
| 6,896,324 B1 | 5/2005 | Kull et al. |
| 6,910,714 B2 | 6/2005 | Browne et al. |
| 6,912,748 B2 | 7/2005 | VanSickle |
| 6,943,653 B2 | 9/2005 | Hanke et al. |
| 6,972,659 B2 | 12/2005 | von Behrens et al. |
| 6,998,546 B1 | 2/2006 | Schmidt et al. |
| 7,017,345 B2 | 3/2006 | Von Behrens et al. |
| 7,086,322 B2 | 8/2006 | Schulz |
| 7,093,903 B2 | 8/2006 | O'Connor et al. |
| 7,100,990 B2 | 9/2006 | Kimura et al. |
| 7,108,316 B2 | 9/2006 | Barvosa-Carter et al. |
| 7,117,673 B2 | 10/2006 | Szilagyi |
| 7,125,077 B2 | 10/2006 | Frank |
| 7,204,472 B2 | 4/2007 | Jones et al. |
| 7,237,847 B2 | 7/2007 | Hancock et al. |
| 7,256,518 B2 | 8/2007 | Gummin |
| 7,293,836 B2 | 11/2007 | Browne et al. |
| 7,306,187 B2 | 12/2007 | Lavan |
| 7,309,104 B2 | 12/2007 | Browne et al. |
| 7,331,616 B2 | 2/2008 | Brei et al. |
| 7,336,486 B2 | 2/2008 | Mongia |
| 7,350,851 B2 | 4/2008 | Barvosa-Carter et al. |
| 7,364,211 B2 | 4/2008 | Niskanen et al. |
| 7,371,052 B2 | 5/2008 | Koeneman |
| 7,446,450 B2 | 11/2008 | Boland et al. |
| 7,448,678 B2 | 11/2008 | Browne et al. |
| 7,476,224 B2 | 1/2009 | Petrakis |
| 7,478,845 B2 | 1/2009 | Mankame et al. |
| 7,484,735 B2 | 2/2009 | Verbrugge et al. |
| 7,501,607 B2 | 3/2009 | Camm et al. |
| 7,506,937 B2 | 3/2009 | Bequet |
| 7,511,402 B2 | 3/2009 | Ito et al. |
| 7,527,312 B1 | 5/2009 | Cucknell et al. |
| 7,556,313 B2 | 7/2009 | Browne et al. |
| 7,578,661 B2 | 8/2009 | Koeneman |
| 7,594,697 B2 | 9/2009 | Browne et al. |
| 7,619,894 B2 | 11/2009 | Wang et al. |
| 7,661,764 B2 | 2/2010 | Ali et al. |
| 7,709,995 B2 | 5/2010 | Hanlon et al. |
| 7,717,520 B2 | 5/2010 | Boren et al. |
| 7,729,828 B2 | 6/2010 | Gandhi |
| 7,731,279 B2 | 6/2010 | Asada et al. |
| 7,735,940 B2 | 6/2010 | Chiu |
| 7,756,246 B2 | 7/2010 | Mikami et al. |
| 7,758,121 B2 | 7/2010 | Browne et al. |
| 7,766,423 B2 | 8/2010 | Alexander et al. |
| 7,770,391 B2 | 8/2010 | Melz et al. |
| 7,814,810 B2 | 10/2010 | Mitteer |
| 7,823,382 B2 | 11/2010 | Ukpai et al. |
| 7,823,972 B2 * | 11/2010 | Browne .................. H04Q 9/00 297/217.2 |
| 7,834,527 B2 | 11/2010 | Rivera et al. |
| 7,878,459 B2 | 2/2011 | Mabe et al. |
| 7,883,148 B2 | 2/2011 | Alexander et al. |
| 7,892,630 B1 | 2/2011 | McKnight et al. |
| 7,901,524 B1 | 3/2011 | McKnight et al. |
| 7,905,538 B2 | 3/2011 | Ukpai et al. |
| 7,905,547 B2 | 3/2011 | Lawall et al. |
| 7,909,403 B2 | 3/2011 | Lawall et al. |
| 7,964,290 B2 | 6/2011 | Mullner et al. |
| 7,965,509 B2 | 6/2011 | Campbell et al. |
| 7,971,296 B2 | 7/2011 | Jansen |
| 7,971,939 B2 | 7/2011 | Fujita et al. |
| 8,016,952 B2 | 9/2011 | Ishida et al. |
| 8,038,215 B2 | 10/2011 | Di Giusto et al. |
| 8,052,112 B2 | 11/2011 | Lawall et al. |
| 8,056,335 B1 | 11/2011 | Brown |
| 8,100,471 B2 | 1/2012 | Lawall et al. |
| 8,109,567 B2 | 2/2012 | Alexander et al. |
| 8,126,615 B2 | 2/2012 | McMillen et al. |
| 8,172,458 B2 | 5/2012 | Petrakis |
| 8,240,677 B2 | 8/2012 | Browne et al. |
| 8,313,108 B2 | 11/2012 | Ac et al. |
| 8,362,882 B2 | 1/2013 | Heubel et al. |
| 8,366,057 B2 | 2/2013 | Vos et al. |
| 8,414,366 B2 | 4/2013 | Browne et al. |
| 8,446,475 B2 | 5/2013 | Topliss et al. |
| 8,448,435 B2 | 5/2013 | Gregory et al. |
| 8,510,924 B2 | 8/2013 | Mankame et al. |
| 8,584,456 B1 | 11/2013 | McKnight |
| 8,585,456 B2 | 11/2013 | Canon |
| 8,593,568 B2 | 11/2013 | Topliss et al. |
| 8,649,242 B2 | 2/2014 | Martin et al. |
| 8,681,496 B2 | 3/2014 | Dede |
| 8,695,334 B2 | 4/2014 | Lewis et al. |
| 8,702,120 B2 | 4/2014 | Kalisz et al. |
| 8,721,557 B2 | 5/2014 | Chen et al. |
| 8,741,076 B2 | 6/2014 | Gao et al. |
| 8,756,933 B2 * | 6/2014 | Topliss .................. F03G 7/065 60/527 |
| 8,793,821 B2 | 8/2014 | Fowkes et al. |
| 8,827,709 B1 | 9/2014 | Gurule et al. |
| 8,830,335 B2 | 9/2014 | Topliss et al. |
| 8,853,916 B2 | 10/2014 | Browne et al. |
| 8,880,141 B2 | 11/2014 | Chen |
| 8,881,347 B2 | 11/2014 | Feinstein |
| 8,894,142 B2 | 11/2014 | Alexander et al. |

(56) References Cited

U.S. PATENT DOCUMENTS

| | | |
|---|---|---|
| 8,912,709 B2 | 12/2014 | Pollock et al. |
| 8,991,769 B2 | 3/2015 | Gandhi |
| 8,998,320 B2 | 4/2015 | Mankame et al. |
| 9,068,561 B2 | 6/2015 | Gondo |
| 9,086,069 B2 | 7/2015 | Dede |
| 9,140,243 B2 | 9/2015 | Gandhi et al. |
| 9,168,814 B2 | 10/2015 | Gandhi |
| 9,171,686 B2 | 10/2015 | Alacqua et al. |
| 9,180,525 B2 | 11/2015 | Park et al. |
| 9,267,495 B2 | 2/2016 | Kopfer et al. |
| 9,298,207 B2 | 3/2016 | Li |
| 9,347,609 B2 | 5/2016 | Pinto, IV et al. |
| 9,428,088 B1 | 8/2016 | Rajasingham |
| 9,457,813 B2 | 10/2016 | Hoerwick et al. |
| 9,457,887 B2 | 10/2016 | Roe et al. |
| 9,495,875 B2 | 11/2016 | Dowdall et al. |
| 9,512,829 B2 | 12/2016 | Alacqua et al. |
| 9,550,466 B2 | 1/2017 | Gandhi |
| 9,588,020 B2 | 3/2017 | Browne et al. |
| 9,662,197 B2 | 5/2017 | Yun et al. |
| 9,664,182 B2 | 5/2017 | Nicolini et al. |
| 9,664,210 B2 | 5/2017 | Ou et al. |
| 9,684,183 B2 | 6/2017 | Brown et al. |
| 9,696,175 B2 | 7/2017 | Hansen et al. |
| 9,697,708 B2 | 7/2017 | Adrezin et al. |
| 9,714,460 B2 | 7/2017 | Merideth |
| 9,719,534 B2 | 8/2017 | Shevchenko et al. |
| 9,731,828 B2 | 8/2017 | Lichota |
| 9,764,220 B2 | 9/2017 | Keating et al. |
| 9,784,249 B2 | 10/2017 | Li et al. |
| 9,784,590 B2 | 10/2017 | Englehardt et al. |
| 9,827,888 B2 | 11/2017 | Patrick et al. |
| 9,848,814 B2 | 12/2017 | Benson et al. |
| 9,943,437 B2 | 4/2018 | Lowe et al. |
| 9,945,490 B2 | 4/2018 | Dankbaar et al. |
| 9,981,421 B2 | 5/2018 | Macroe et al. |
| 9,994,136 B2 | 6/2018 | Nakada |
| 10,007,263 B1 | 6/2018 | Fields et al. |
| 10,029,618 B2 | 7/2018 | Perez Astudillo et al. |
| 10,059,334 B1 | 8/2018 | Zhu et al. |
| 10,061,350 B2 | 8/2018 | Magi |
| 10,066,829 B2 | 9/2018 | Wong et al. |
| 10,168,782 B1 | 1/2019 | Tchon et al. |
| 10,191,550 B1 | 1/2019 | Nussbaum et al. |
| 10,208,823 B2 | 2/2019 | Kashani |
| 10,299,520 B1 | 5/2019 | Shaffer et al. |
| 10,302,586 B2 | 5/2019 | Sun et al. |
| 10,315,771 B1 | 6/2019 | Rao et al. |
| 10,330,144 B1 | 6/2019 | Alqasimi et al. |
| 10,330,400 B2 | 6/2019 | Dede |
| 10,335,044 B2 | 7/2019 | Banet et al. |
| 10,349,543 B2 | 7/2019 | Sreetharan et al. |
| 10,355,624 B2 | 7/2019 | Majdi et al. |
| 10,371,229 B2 | 8/2019 | Gandhi et al. |
| 10,371,299 B2 | 8/2019 | Leffler |
| 10,377,278 B2 | 8/2019 | Ketels et al. |
| 10,427,634 B2 | 10/2019 | Gandhi et al. |
| 10,434,973 B2 | 10/2019 | Gandhi et al. |
| 10,441,491 B2 | 10/2019 | Wyatt et al. |
| 10,459,475 B2 | 10/2019 | Gandhi et al. |
| 10,479,246 B2 | 11/2019 | Meingast et al. |
| 10,532,672 B1 | 1/2020 | Pinkelman et al. |
| 10,583,757 B2 | 3/2020 | Ketels et al. |
| 10,591,078 B2 | 3/2020 | Oehler et al. |
| 10,647,237 B2 | 5/2020 | Song |
| 10,677,310 B2 | 6/2020 | Gandhi et al. |
| 10,682,931 B2 | 6/2020 | Rowe et al. |
| 10,759,320 B2 | 9/2020 | Mochizuki |
| 10,773,487 B2 | 9/2020 | Frigerio et al. |
| 10,781,800 B2 | 9/2020 | Brown et al. |
| 10,814,514 B2 | 10/2020 | Aihara |
| 10,843,611 B2 | 11/2020 | Caruss et al. |
| 10,933,974 B2 | 3/2021 | Tsuruta et al. |
| 10,960,793 B2 | 3/2021 | Gandhi et al. |
| 10,965,172 B2 | 3/2021 | Dede et al. |
| 10,993,526 B2 | 5/2021 | Vandewall et al. |
| 10,995,779 B2 | 5/2021 | Keplinger et al. |
| 11,048,329 B1 | 6/2021 | Lee et al. |
| 11,091,060 B2 | 8/2021 | Pinkelman et al. |
| 11,125,248 B2 | 9/2021 | Joshi et al. |
| 11,137,045 B2 | 10/2021 | Gandhi et al. |
| 11,180,052 B2 | 11/2021 | Severgnini et al. |
| 11,241,842 B2 | 2/2022 | Gandhi et al. |
| 11,247,584 B2 | 2/2022 | Breitweg et al. |
| 11,248,592 B1 | 2/2022 | Tsuruta et al. |
| 11,269,891 B2 | 3/2022 | Frank et al. |
| 11,285,844 B2 | 3/2022 | Gandhi et al. |
| 11,353,009 B1 | 6/2022 | Rowe et al. |
| 11,356,255 B1 | 6/2022 | Emelyanov et al. |
| 11,370,330 B2 | 6/2022 | Gandhi et al. |
| 11,372,481 B2 | 6/2022 | Leroy et al. |
| 11,377,007 B2 | 7/2022 | Samain et al. |
| 11,458,874 B2 | 10/2022 | Nagai et al. |
| 11,460,009 B1 | 10/2022 | Tsuruta et al. |
| 11,460,010 B1 | 10/2022 | Tsuruta et al. |
| 11,467,669 B2 | 10/2022 | Liu et al. |
| 11,472,325 B1 | 10/2022 | Tsuruta et al. |
| 11,486,421 B2 | 11/2022 | Keplinger et al. |
| 11,536,255 B1 | 12/2022 | Rowe |
| 11,542,925 B1 | 1/2023 | Rowe et al. |
| 11,577,471 B2 | 2/2023 | Gandhi et al. |
| 11,591,076 B2 | 2/2023 | Song et al. |
| 11,592,010 B1 | 2/2023 | Panwar et al. |
| 11,592,037 B1 | 2/2023 | Rowe et al. |
| 11,603,153 B2 | 3/2023 | Trager et al. |
| 11,603,828 B2 | 3/2023 | Gummin et al. |
| 11,624,376 B2 | 4/2023 | Rowe et al. |
| 11,628,898 B1 | 4/2023 | Trager et al. |
| 11,642,083 B2 | 5/2023 | Severgnini et al. |
| 11,649,808 B2 | 5/2023 | Tsuruta et al. |
| 11,668,287 B2 | 6/2023 | Naly et al. |
| 11,702,015 B2 | 7/2023 | Pinkelman et al. |
| 11,732,735 B2 | 8/2023 | Song et al. |
| 11,750,115 B2 | 9/2023 | Saneyoshi et al. |
| 11,752,901 B2 | 9/2023 | Gandhi et al. |
| 11,795,924 B2 | 10/2023 | Rowe |
| 11,840,161 B2 | 12/2023 | Schmalenberg et al. |
| 11,841,008 B1 | 12/2023 | Panwar et al. |
| 11,885,428 B2 | 1/2024 | Panwar et al. |
| 11,897,379 B2 | 2/2024 | Tsuruta et al. |
| 11,913,436 B2 | 2/2024 | Easton et al. |
| 11,927,206 B2 | 3/2024 | Rowe et al. |
| 2002/0130754 A1 | 9/2002 | Alacqua et al. |
| 2002/0179663 A1 | 12/2002 | Moore et al. |
| 2003/0000605 A1 | 1/2003 | Homma |
| 2003/0182041 A1 | 9/2003 | Watson |
| 2004/0035108 A1 | 2/2004 | Szilagyi |
| 2004/0041998 A1 | 3/2004 | Haddad |
| 2004/0104580 A1 | 6/2004 | Spiessl et al. |
| 2004/0118854 A1 | 6/2004 | Kutun |
| 2004/0145230 A1 | 7/2004 | Fujita et al. |
| 2004/0195888 A1 | 10/2004 | Frye |
| 2004/0256920 A1 | 12/2004 | Gummin et al. |
| 2004/0261411 A1 | 12/2004 | MacGregor |
| 2005/0023086 A1 | 2/2005 | Szilagyi |
| 2005/0082897 A1 | 4/2005 | Ropp et al. |
| 2005/0066810 A1 | 5/2005 | Schulz |
| 2005/0111177 A1 | 5/2005 | Kwitek |
| 2005/0146147 A1 | 7/2005 | Niskanen et al. |
| 2005/0198904 A1 | 9/2005 | Browne et al. |
| 2005/0199455 A1 | 9/2005 | Browne et al. |
| 2005/0199845 A1 | 9/2005 | Jones et al. |
| 2005/0206096 A1 | 9/2005 | Browne et al. |
| 2005/0210874 A1 | 9/2005 | Browne et al. |
| 2005/0211198 A1 | 9/2005 | Froeschle et al. |
| 2005/0227607 A1 | 10/2005 | Stevenson et al. |
| 2005/0253425 A1 | 11/2005 | Asada et al. |
| 2006/0033312 A1 | 2/2006 | Barvosa-Carter et al. |
| 2006/0038643 A1 | 2/2006 | Xu et al. |
| 2006/0038745 A1 | 2/2006 | Naksen et al. |
| 2006/0074325 A1 | 4/2006 | Karo et al. |
| 2006/0201149 A1 | 9/2006 | Biggs et al. |
| 2006/0223637 A1 | 10/2006 | Rosenberg |
| 2006/0226013 A1 | 10/2006 | Decre et al. |

(56) References Cited

U.S. PATENT DOCUMENTS

| | | |
|---|---|---|
| 2006/0244293 A1 | 11/2006 | Buffa |
| 2006/0265965 A1 | 11/2006 | Butera et al. |
| 2007/0025575 A1 | 2/2007 | Oser et al. |
| 2007/0046074 A1 | 3/2007 | Satta et al. |
| 2007/0063566 A1 | 3/2007 | Browne et al. |
| 2007/0084220 A1 | 4/2007 | Asada et al. |
| 2007/0188004 A1 | 8/2007 | Browne et al. |
| 2007/0205853 A1 | 9/2007 | Taya et al. |
| 2007/0236071 A1 | 10/2007 | Fujita et al. |
| 2007/0246285 A1 | 10/2007 | Browne et al. |
| 2007/0246898 A1 | 10/2007 | Keefe et al. |
| 2007/0246979 A1 | 10/2007 | Browne et al. |
| 2007/0271939 A1 | 11/2007 | Ichigaya |
| 2007/0277877 A1 | 12/2007 | Ghorbal et al. |
| 2008/0006353 A1 | 1/2008 | Elzey et al. |
| 2008/0018198 A1 | 1/2008 | Sohn et al. |
| 2008/0085436 A1 | 4/2008 | Langan et al. |
| 2008/0100118 A1 | 5/2008 | Young et al. |
| 2008/0114218 A1 | 5/2008 | Suyama et al. |
| 2008/0219501 A1 | 9/2008 | Matsumoto |
| 2008/0267770 A1 | 10/2008 | Webster et al. |
| 2008/0271559 A1 | 11/2008 | Garscha et al. |
| 2008/0272259 A1 | 11/2008 | Zavattieri et al. |
| 2008/0307786 A1 | 12/2008 | Hafez et al. |
| 2009/0008973 A1 | 1/2009 | Browne |
| 2009/0009656 A1 | 1/2009 | Honda et al. |
| 2009/0030576 A1 | 1/2009 | Periot et al. |
| 2009/0041085 A1 | 2/2009 | Petrakis |
| 2009/0108607 A1 | 4/2009 | Browne et al. |
| 2009/0115284 A1 | 5/2009 | Liang et al. |
| 2009/0131752 A1 | 5/2009 | Park |
| 2009/0143730 A1 | 6/2009 | De Polo et al. |
| 2009/0173305 A1 | 7/2009 | Alexander et al. |
| 2009/0212158 A1 | 8/2009 | Mabe et al. |
| 2009/0218858 A1 | 9/2009 | Lawall et al. |
| 2009/0224584 A1 | 9/2009 | Lawall et al. |
| 2009/0224587 A1 | 9/2009 | Lawall et al. |
| 2009/0241537 A1 | 10/2009 | Browne et al. |
| 2009/0242285 A1 | 10/2009 | Whetstone, Jr. |
| 2009/0283643 A1 | 11/2009 | Sar et al. |
| 2009/0284059 A1 | 11/2009 | Gupta et al. |
| 2010/0001568 A1 | 1/2010 | Trybus et al. |
| 2010/0027119 A1 | 2/2010 | Kollar et al. |
| 2010/0031525 A1 | 2/2010 | Allezy et al. |
| 2010/0036567 A1 | 2/2010 | Gandhi |
| 2010/0066142 A1 | 3/2010 | Gross et al. |
| 2010/0117663 A1 | 5/2010 | Herrera et al. |
| 2010/0192567 A1 | 8/2010 | Butera |
| 2010/0212312 A1 | 8/2010 | Rudduck |
| 2010/0221124 A1 | 9/2010 | Ikushima et al. |
| 2010/0244505 A1 | 9/2010 | Demick et al. |
| 2010/0275592 A1 | 11/2010 | Topliss et al. |
| 2010/0282902 A1 | 11/2010 | Rajasingham |
| 2010/0287965 A1 | 11/2010 | Bryant |
| 2010/0294476 A1 | 11/2010 | Gomi et al. |
| 2010/0308689 A1 | 12/2010 | Rahman et al. |
| 2010/0326070 A1 | 12/2010 | Hao et al. |
| 2011/0021932 A1 | 1/2011 | Kim et al. |
| 2011/0030380 A1 | 2/2011 | Widdle, Jr. et al. |
| 2011/0038727 A1 | 2/2011 | Vos et al. |
| 2011/0111839 A1 | 5/2011 | Lesley et al. |
| 2011/0120119 A1 | 5/2011 | Alexander et al. |
| 2011/0150669 A1 | 6/2011 | Frayne et al. |
| 2011/0179790 A1 | 7/2011 | Pretorius |
| 2011/0217031 A1 | 9/2011 | Eromaki |
| 2011/0300358 A1 | 12/2011 | Blohowiak et al. |
| 2012/0019216 A1 | 1/2012 | Lewis et al. |
| 2012/0049095 A1 | 3/2012 | Yamasaki |
| 2012/0056459 A1 | 3/2012 | Harden |
| 2012/0081337 A1 | 4/2012 | Camp, Jr. et al. |
| 2012/0109025 A1 | 5/2012 | Weinberg et al. |
| 2012/0136126 A1 | 5/2012 | Rousseau |
| 2012/0181896 A1 | 7/2012 | Kornbluh et al. |
| 2012/0232783 A1 | 9/2012 | Calkins et al. |
| 2012/0237309 A1 | 9/2012 | Park et al. |
| 2012/0239183 A1 | 9/2012 | Mankame et al. |
| 2012/0267928 A1 | 10/2012 | Mankame et al. |
| 2012/0276807 A1 | 11/2012 | Cabrera |
| 2012/0292155 A1 | 11/2012 | Gunter |
| 2012/0297763 A1 | 11/2012 | Mankame et al. |
| 2012/0319445 A1 | 12/2012 | Zolno et al. |
| 2013/0005442 A1 | 1/2013 | Erickson et al. |
| 2013/0011806 A1 | 1/2013 | Gao et al. |
| 2013/0043354 A1 | 2/2013 | Shome et al. |
| 2013/0075210 A1 | 3/2013 | Langbein et al. |
| 2013/0098029 A1 | 4/2013 | Pinto, IV et al. |
| 2013/0188313 A1 | 7/2013 | Dede |
| 2013/0205770 A1 | 8/2013 | Browne et al. |
| 2013/0227943 A1 | 9/2013 | Mance et al. |
| 2014/0130491 A1 | 5/2014 | Gandhi et al. |
| 2014/0168894 A1 | 6/2014 | Dede |
| 2014/0196633 A1 | 7/2014 | Shaw |
| 2014/0207333 A1 | 7/2014 | Vandivier et al. |
| 2014/0217792 A1 | 8/2014 | Meyer |
| 2014/0239677 A1 | 8/2014 | Laib et al. |
| 2014/0243939 A1* | 8/2014 | Lowe ............... A61F 7/0085 607/104 |
| 2014/0250881 A1 | 9/2014 | Yamamoto |
| 2014/0265468 A1 | 9/2014 | Greenhill et al. |
| 2014/0265479 A1 | 9/2014 | Bennett |
| 2014/0277739 A1 | 9/2014 | Kornbluh et al. |
| 2014/0298794 A1 | 10/2014 | Flaschentrager et al. |
| 2014/0314976 A1 | 10/2014 | Niiyama et al. |
| 2014/0316269 A1 | 10/2014 | Zhang et al. |
| 2014/0333088 A1 | 11/2014 | Lang et al. |
| 2014/0338324 A1 | 11/2014 | Jasklowski |
| 2015/0016968 A1 | 1/2015 | Grabowska et al. |
| 2015/0130220 A1 | 5/2015 | Preisler et al. |
| 2015/0185764 A1 | 7/2015 | Magi |
| 2015/0197173 A1 | 7/2015 | Hulway |
| 2015/0202993 A1* | 7/2015 | Mankame ............ B60N 2/66 297/284.4 |
| 2015/0274078 A1 | 10/2015 | Alacqua et al. |
| 2015/0289994 A1 | 10/2015 | Engeberg et al. |
| 2015/0290015 A1 | 10/2015 | Elahinia et al. |
| 2015/0331488 A1 | 11/2015 | Grant et al. |
| 2015/0366350 A1 | 12/2015 | DiCenso et al. |
| 2016/0004298 A1 | 1/2016 | Mazed et al. |
| 2016/0032997 A1 | 2/2016 | Seepersad et al. |
| 2016/0061345 A1 | 3/2016 | Jackson, Jr. |
| 2016/0082984 A1 | 3/2016 | Schmidt |
| 2016/0084665 A1 | 3/2016 | Englehardt et al. |
| 2016/0123793 A1 | 5/2016 | Kolich et al. |
| 2016/0221475 A1 | 8/2016 | Sugiyama |
| 2016/0246374 A1 | 8/2016 | Carter et al. |
| 2016/0278459 A1 | 9/2016 | Hilty |
| 2016/0325837 A1 | 11/2016 | Erhel et al. |
| 2016/0345088 A1 | 11/2016 | Vilermo et al. |
| 2016/0375835 A1 | 12/2016 | Murray et al. |
| 2017/0116792 A1 | 4/2017 | Jelinek et al. |
| 2017/0121068 A1 | 5/2017 | Foshansky et al. |
| 2017/0123499 A1 | 5/2017 | Eid |
| 2017/0148102 A1 | 5/2017 | Franke et al. |
| 2017/0153707 A1 | 6/2017 | Subramanian et al. |
| 2017/0158104 A1 | 6/2017 | Le et al. |
| 2017/0166222 A1 | 6/2017 | James |
| 2017/0174236 A1 | 6/2017 | Worden et al. |
| 2017/0203432 A1 | 7/2017 | Andrianesis |
| 2017/0240075 A1 | 8/2017 | McCoy et al. |
| 2017/0252260 A1 | 9/2017 | Gummin et al. |
| 2017/0328384 A1 | 11/2017 | Goto et al. |
| 2017/0355288 A1 | 12/2017 | Barbat et al. |
| 2018/0001113 A1 | 1/2018 | Streeter |
| 2018/0012433 A1 | 1/2018 | Ricci |
| 2018/0036198 A1 | 2/2018 | Mergl et al. |
| 2018/0073491 A1 | 3/2018 | Gissen et al. |
| 2018/0084915 A1 | 3/2018 | Norman et al. |
| 2018/0115260 A1 | 4/2018 | Chiba et al. |
| 2018/0130347 A1 | 5/2018 | Ricci et al. |
| 2018/0132825 A1 | 5/2018 | Tachibana |
| 2018/0134191 A1 | 5/2018 | Ketels et al. |
| 2018/0141562 A1 | 5/2018 | Singhal |
| 2018/0149141 A1 | 5/2018 | Cullen et al. |
| 2018/0151035 A1 | 5/2018 | Maalouf et al. |

(56) References Cited

U.S. PATENT DOCUMENTS

| | | |
|---|---|---|
| 2018/0178808 A1 | 6/2018 | Zhao et al. |
| 2018/0249772 A1 | 9/2018 | Koo et al. |
| 2018/0251234 A1 | 9/2018 | Wang |
| 2018/0264975 A1 | 9/2018 | Bonk et al. |
| 2018/0281621 A1 | 10/2018 | Kaku et al. |
| 2018/0286189 A1 | 10/2018 | Motamedi et al. |
| 2018/0321703 A1 | 11/2018 | Gandhi et al. |
| 2018/0345841 A1 | 12/2018 | Prokhorov et al. |
| 2018/0348759 A1 | 12/2018 | Freeman et al. |
| 2018/0355991 A1 | 12/2018 | Pfahler |
| 2019/0005272 A1 | 1/2019 | Gault et al. |
| 2019/0023161 A1 | 1/2019 | Sullivan et al. |
| 2019/0039525 A1 | 2/2019 | Hu |
| 2019/0041986 A1 | 2/2019 | Rihn et al. |
| 2019/0042857 A1 | 2/2019 | Endo et al. |
| 2019/0059608 A1 | 2/2019 | Yan et al. |
| 2019/0061307 A1 | 2/2019 | Chen et al. |
| 2019/0083022 A1 | 3/2019 | Huang |
| 2019/0135150 A1 | 5/2019 | Gao et al. |
| 2019/0143869 A1 | 5/2019 | Sequi et al. |
| 2019/0154122 A1 | 5/2019 | Lima et al. |
| 2019/0197842 A1 | 6/2019 | Long et al. |
| 2019/0232842 A1 | 8/2019 | Boccuccia et al. |
| 2019/0291649 A1 | 9/2019 | Ito |
| 2020/0010001 A1 | 1/2020 | Pinkelman et al. |
| 2020/0015493 A1 | 1/2020 | Ergun et al. |
| 2020/0015593 A1 | 1/2020 | Norman et al. |
| 2020/0032822 A1 | 1/2020 | Keplinger et al. |
| 2020/0088175 A1 | 3/2020 | Li et al. |
| 2020/0112269 A1 | 4/2020 | Taghavi et al. |
| 2020/0179168 A1 | 6/2020 | Kelleher et al. |
| 2020/0197250 A1 | 6/2020 | Wyatt et al. |
| 2020/0223325 A1 | 7/2020 | Pinkelman et al. |
| 2020/0238854 A1 | 7/2020 | Gandhi et al. |
| 2020/0247274 A1* | 8/2020 | Gandhi ............... B60N 2/0296 |
| 2020/0276971 A1 | 9/2020 | Takeda et al. |
| 2020/0282878 A1 | 9/2020 | Gandhi et al. |
| 2020/0298732 A1 | 9/2020 | Gandhi et al. |
| 2020/0307416 A1 | 10/2020 | Gandhi et al. |
| 2020/0309102 A1 | 10/2020 | Henderson et al. |
| 2020/0339242 A1 | 10/2020 | Tsuruta et al. |
| 2020/0377036 A1 | 12/2020 | Lee et al. |
| 2020/0378370 A1 | 12/2020 | Kopfer et al. |
| 2021/0095646 A1 | 4/2021 | Blecha et al. |
| 2021/0118597 A1 | 4/2021 | Pinkelman et al. |
| 2021/0132396 A1 | 5/2021 | Shin et al. |
| 2021/0153754 A1 | 5/2021 | Ozawa et al. |
| 2021/0162457 A1 | 6/2021 | Eberfors |
| 2021/0221269 A1 | 7/2021 | Baranowski et al. |
| 2021/0236061 A1 | 8/2021 | Severgnini et al. |
| 2021/0237809 A1 | 8/2021 | Rowe et al. |
| 2021/0265922 A1 | 8/2021 | Nakagawa |
| 2022/0001530 A1 | 1/2022 | Sameoto et al. |
| 2022/0012458 A1 | 1/2022 | Uetabira |
| 2022/0031178 A1 | 2/2022 | Brulet et al. |
| 2022/0106941 A1 | 4/2022 | Easton |
| 2022/0119202 A1 | 4/2022 | Morrissey et al. |
| 2022/0154703 A1 | 5/2022 | Shin et al. |
| 2022/0164079 A1 | 5/2022 | Severgnini et al. |
| 2022/0196109 A1 | 6/2022 | Gandhi et al. |
| 2022/0242328 A1 | 8/2022 | Pinkelman et al. |
| 2022/0258656 A1 | 8/2022 | Little |
| 2022/0299016 A1 | 9/2022 | Tsuruta et al. |
| 2022/0307485 A1 | 9/2022 | Gummin et al. |
| 2022/0314857 A1 | 10/2022 | Tsuruta et al. |
| 2022/0316458 A1 | 10/2022 | Tsuruta et al. |
| 2022/0412325 A1* | 12/2022 | Kopfer et al. .......... F03G 7/065 |
| 2023/0078040 A1 | 3/2023 | Rowe et al. |
| 2023/0088911 A1 | 3/2023 | Song et al. |
| 2023/0119407 A1 | 4/2023 | Sugiyama et al. |
| 2023/0120436 A1 | 4/2023 | Tsuruta et al. |
| 2023/0124526 A1 | 4/2023 | Tsuruta et al. |
| 2023/0136197 A1 | 5/2023 | Gilmore et al. |
| 2023/0179122 A1 | 6/2023 | Palaniswamy et al. |
| 2023/0191953 A1 | 6/2023 | Panwar et al. |
| 2023/0193929 A1 | 6/2023 | Rowe et al. |
| 2023/0287871 A1 | 9/2023 | Rowe |
| 2023/0312109 A1 | 10/2023 | Joshi et al. |
| 2023/0331371 A1 | 10/2023 | Gupta et al. |
| 2023/0331372 A1 | 10/2023 | Gupta et al. |
| 2023/0337827 A1 | 10/2023 | Pinkelman et al. |
| 2024/0060480 A1 | 2/2024 | Panwar et al. |

FOREIGN PATENT DOCUMENTS

| | | |
|---|---|---|
| CN | 101417152 A | 4/2009 |
| CN | 102333504 A | 1/2012 |
| CN | 102152309 B | 11/2012 |
| CN | 103038094 A | 4/2013 |
| CN | 103147511 A | 6/2013 |
| CN | 102026842 B | 7/2013 |
| CN | 103935495 A | 7/2014 |
| CN | 102765354 B | 11/2014 |
| CN | 104290617 A | 1/2015 |
| CN | 204774820 U | 11/2015 |
| CN | 105517664 A | 4/2016 |
| CN | 106168523 A | 11/2016 |
| CN | 107111473 A | 1/2017 |
| CN | 206029888 U | 3/2017 |
| CN | 105946515 B | 4/2018 |
| CN | 108100228 A | 6/2018 |
| CN | 108819806 A | 11/2018 |
| CN | 106014897 B | 12/2018 |
| CN | 106956254 B | 3/2019 |
| CN | 109572966 A | 4/2019 |
| CN | 209010975 U | 6/2019 |
| CN | 105003405 B | 7/2019 |
| CN | 107485536 B | 1/2020 |
| CN | 112411375 A | 2/2021 |
| CN | 115706489 A | 2/2023 |
| DE | 10155119 A1 | 5/2003 |
| DE | 20309196 U1 | 11/2003 |
| DE | 10222022 A1 | 12/2003 |
| DE | 102010021902 A1 | 12/2011 |
| DE | 102016210214 A1 | 12/2017 |
| DE | 102019204866 A1 | 10/2020 |
| DE | 102008021679 B4 | 1/2021 |
| EP | 1420094 A1 | 5/2004 |
| EP | 1519055 A2 | 3/2005 |
| EP | 1904337 B1 | 10/2010 |
| EP | 2723069 A1 | 4/2014 |
| EP | 3196484 A1 | 7/2017 |
| FR | 3058108 A1 | 5/2018 |
| JP | S5870892 U | 5/1983 |
| JP | S61277898 A | 12/1986 |
| JP | H03276698 A | 12/1991 |
| JP | H06033895 A | 6/1994 |
| JP | 09-133069 A | 5/1997 |
| JP | H09168285 A | 6/1997 |
| JP | H10337061 A | 12/1998 |
| JP | 2003276698 A | 10/2003 |
| JP | 3706899 B2 | 10/2005 |
| JP | 2006000347 A | 1/2006 |
| JP | 2006006581 A | 1/2006 |
| JP | 2006248456 A | 9/2006 |
| JP | 2008014470 A | 1/2008 |
| JP | 2008138558 A | 6/2008 |
| JP | 2008154447 A | 7/2008 |
| JP | 4273902 B2 | 6/2009 |
| JP | 2009162233 A | 7/2009 |
| JP | 2010117457 A | 5/2010 |
| JP | 4576281 B2 | 11/2010 |
| JP | 5760241 | 8/2015 |
| JP | 2017175155 A | 9/2017 |
| JP | 2018188035 A | 11/2018 |
| JP | 2019094789 A | 6/2019 |
| JP | 2019101988 A | 6/2019 |
| JP | 20200090181 A | 6/2020 |
| JP | 2021107221 A | 7/2021 |
| KR | 19980044089 U | 9/1998 |
| KR | 20050056526 A | 6/2005 |
| KR | 1020130005989 | 1/2013 |
| KR | 101395364 B1 | 5/2014 |
| KR | 101861620 B1 | 4/2018 |

(56) References Cited

FOREIGN PATENT DOCUMENTS

| | | | |
|---|---|---|---|
| KR | 1020180074003 A | 7/2018 |
| KR | 101931791 B1 | 12/2018 |
| KR | 20210052091 A | 5/2021 |
| KR | 20210086518 A | 7/2021 |
| KR | 102298464 B1 | 9/2021 |
| WO | 02011648 A1 | 2/2002 |
| WO | 2005004321 A1 | 1/2005 |
| WO | 2009079668 A2 | 6/2009 |
| WO | 2009111362 A2 | 9/2009 |
| WO | 2011017071 A2 | 2/2011 |
| WO | 2011111769 A1 | 9/2011 |
| WO | 2014145018 A2 | 9/2014 |
| WO | 2014172320 A1 | 10/2014 |
| WO | 2015037600 A1 | 3/2015 |
| WO | 2016017057 A1 | 2/2016 |
| WO | 2016130719 A2 | 8/2016 |
| WO | 2017077541 A1 | 5/2017 |
| WO | 2019043599 A1 | 3/2019 |
| WO | 2019097437 A1 | 5/2019 |
| WO | 2019173227 A1 | 9/2019 |
| WO | 2020110091 A2 | 6/2020 |
| WO | 2020183360 A1 | 9/2020 |
| WO | 2021118185 A2 | 6/2021 |

OTHER PUBLICATIONS

Rowe et al., U.S. Appl. No. 18/329,217, filed Jun. 5, 2023.
Pinkelman et al., U.S. Appl. No. 18/452,343, filed Aug. 18, 2023.
Pinkelman et al., U.S. Appl. No. 18/452,376, filed Aug. 18, 2023.
Rowe et al., U.S. Appl. No. 18/453,395, filed Aug. 22, 2023.
Rowe et al., U.S. Appl. No. 18/452,734, filed Aug. 21, 2023.
Jani et al., "A review of shape memory alloy research, applications, and opportunities", Elsevier, 2014, pp. 1078-1113 (36 pages).
Tiseo et al., "A Shape Memory Alloy Based Tuneable Dynamic Vibration Absorber for Vibration Tonal Control", Journal of Theoretical and Applied Mechanics, 2010, pp. 135-153 (19 pages).
Williams et al., "Dynamic modelling of a shape memory alloy adaptive tuned vibration absorber", Elsevier, Journal of Vibration and Sound, 2005, pp. 211-234 (24 pages).
Araki et al., "Integrated mechanical and material design of quasi-zero-stiffness vibration isolator with superelastic Cu—Al—Mn shape memory alloy bars", Journal of Sound and Vibration, 2015 (34 pages).
Casciati et al., "Performance of a base isolator with shape memory alloy bars", Earthquake Engineering and Engineering Vibration, Dec. 2007 (8 pages).
Correa et al., "Mechanical Design of Negative Stiffness Honeycomb Materials", Integrating Materials and Manufacturing Innovation, 4:10, pp. 1-11, 2015 (11 pages).
Ferguson-Pell, "Seat Cushion Selection", J. Rehab. Res. Dev., Special Supplement #2, 23(3), pp. 49-73, 1986 (25 pages).
Miga Motor Company, "Miga Adrenaline—A Space Age Wire," retrieved from the Internet: <https://migamotors.com/index.php?main_page=product_info&cPath=1&products_id=37>, [retrieved Mar. 26, 2021] (1 page).
Furukawa Techno Material, "Shape Memory Alloys & Super-elastic Alloys," retrieved from the Internet: <https://www.furukawa-ftm.com/english/nt-e/product.htm>, [retrieved Mar. 26, 2021] (3 pages).
Endragon Technology Corporation, "What is Electrostatic Chuck?" retrieved from the Internet: <https://edragoncorp.weebly.com/what-is-electrostatic-chuck.html>, 2014 (8 pages).
Strittmatter et al., "Intelligent materials in modern production—Current trends for thermal shape memory alloys," Procedia Manufacturing, vol. 30, pp. 347-356, 2019 (10 pages).
Shunk, "GM awarded DOE money to research Shape Memory Alloy heat engines," dated Nov. 2, 2009, retrieved from the Internet: <https://www.autoblog.com/2009/11/02/gm-awarded-doe-money-to-research-shape-memory-alloy-heat-engines/>, [retrieved Mar. 26, 2021] (2 pages).
Gummin, "Shape Memory Alloy Massage for Seating Surfaces," dated Jun. 15, 2018, retrieved from the Internet: <https://contest.techbriefs.com/2018/entries/consumer-products/8871> (3 pages).
Stoeckel, "Shape Memory Actuators for Automotive Applications," Materials & Design. Vol. 11, No. 6, pp. 302-307, Dec. 1990 (6 pages).
Katayama et al., "Shape Memory Alloy Wire Actuated Hinge Mechanism for Deploying Segmented Plates," Bulletin of Osaka Prefecture University, Series A, vol. 45, No. 2, 1996, pp. 119-124 (8 pages).
Rowe et al., U.S. Appl. No. 63/485,398, filed Feb. 16, 2023.
Pinkelman et al., U.S. Appl. No. 17/729,522, filed Apr. 26, 2022.
Barbarino et al., "A review on shape memory alloys with applications to morphing aircraft", Smart Materials and Structures, Apr. 2014 (19 pages).
"HapWRAP: Soft Growing Wearable Haptic Device", retrieved from the Internet: <https://smartdevicess.createdsites.com>, dated May 27, 2019 (18 pages).
Yilmaz et al., "Detecting Vital Signs with Wearable Wireless Sensors", Sensors, Dec. 2010 (26 pages).
Choi et al. "Highly conductive, stretchable, and biocompatible Ag—Au core-sheath nanowire composite for wearable and implantable bioelectronics", Nature Nanotechnology 13, No. 11, 2018 (36 pages).
Gao et al., "Wearable Microfluidic Diaphragm Pressure Sensor for Health and Tactile Touch Monitoring", Advanced Materials, Oct. 2017 (15 pages).
Kweon et al., "Wearable high-performance pressure sensors based on three-dimensional electrospun conductive nanofibers", NPG Asia Materials 2018 (12 pages).
Wang et al. "Monitoring of the central blood pressure waveform via a conformal ultrasonic device", Nat Biomed Eng, Sep. 2018 (22 pages).
Agharese et al. "hapWRAP: Soft Growing Wearable Haptic Device", 2018 IEEE International Conference on Robotics and Automation (ICRA), May 2018 (7 pages).
Gao et al., "Fully integrated wearable sensor arrays for multiplexed in situ perspiration analysis", Nature, Jan. 2016 (30 pages).
Jitosho et al. "Exploiting Bistability for High Force Density Reflexive Gripping", 2019 International Conference on Robotics and Automation (ICRA), May 2019 (7 pages).
Wikipedia, "Slap bracelet", retrieved from the Internet: <https://en.wikipedia.org/wiki/Slap_bracelet>, [retrieved Mar. 12, 2021] (2 pages).
Maffiodo et al. "Three-Fingered Gripper with Flexure Hinges Actuated by Shape Memory Alloy Wires", Int. J. of Automation Technology, vol. 11, No. 3, pp. 355-360, 2017 (6 pages).
Buckner et al. "Roboticizing fabric by integrating functional fibers", Proceedings of the National Academy of Sciences, Oct. 2020 (10 pages).
Blain, "Refrigerants not required: Flexible metal cooling prototype demonstrates extreme efficiency", retrieved from the Internet: <https://newatlas.com/shape-memory-alloy-nitinol-heating-cooling/58837/> [retrieved Apr. 1, 2024], dated Mar. 13, 2019 (13 pages).
Taniguchi, "Flexible Artificial Muscle Actuator Using Coiled Shape Memory Alloy Wires", APCBEE Procedia 7, pp. 54-59, May 2013 (6 pages).
Acome et al., "Hydraulically amplified self-healing electrostatic actuators with muscle-like performance", Science 359, pp. 61-65, 2018 (5 pages).
Wang et al., "Recent Progress in Artificial Muscles for Interactive Soft Robotics", Advanced Materials, vol. 33, Issue 19, published Oct. 27, 2020 (48 pages).
Liang et al., "Comparative study of robotic artificial actuators and biological muscle", Advances in Mechanical Engineering, 2020 (25 pages).
El-Atab et al., "Soft Actuators for Soft Robotic Applications: A Review", Advanced Intelligent Systems 2020 (37 pages).
Pagoli et al., "Review of soft fluidic actuators: classification and materials modeling analysis", Smart Materials and Structures, vol. 31, 2021 (31 pages).
Park et al., "A Novel Fabric Muscle Based on Shape Memory Alloy Springs", Soft Robotics, vol. 7, No. 3, 2020 (11 pages).

(56) References Cited

OTHER PUBLICATIONS

Ebay, "Cardboard Dividers 5 Sets 7.5" X 10.5" X 4" High 12 cell", retrieved from the Internet: <https://www.ebay.comitm/175101454003var=0&mkevt=1&mkcid=1&mkrid=711-53200-19255-0&campid=5337076261&toolid=10049&customid=ACF63RFK9J675c23041e8b13f9c32042ed51988cf3> [retrieved Jan. 20, 2022](1 page).

Cazottes et al., "Bistable Buckled Beam: Modeling of Actuating Force and Experimental Validations", Journal of Mechanical Design, 2009 (10 pages).

Cazottes et al., "Design of Actuation for Bistable Structures Using Smart Materials," Advances in Science and Technology, vol. 54, pp. 287-292, 2008 (1st Page/Abstract only).

Cazottes et al., "Actuation of bistable buckled beams with Macro-Fiber Composites," IEEE/RSJ International Conference on Intelligent Robots and Systems, pp. 564-569, 2008 (7 pages).

Haines et al., "New Twist on Artificial Muscles," Proceedings of the National Academy of Sciences, vol. 113, No. 42, pp. 11709-11716, Oct. 18, 2016 (9 pages).

Inoue et al., "High-performance structure of a coil-shaped soft-actuator consisting of polymer threads and carbon nanotube yarns," AIP Advances 8, 2018, (8 pages).

Abbas et al., "A Physics Based Model for Twisted and Coiled Actuator" 2017 IEEE International Conference on Robotics and Automation (ICRA), pp. 6121-6126, 2017 (6 pages).

Haines et al., "Artificial Muscles from Fishing Line and Sewing Thread" (Supplementary Materials) Science 343, 868, 2014 (36 pages).

Yip et al., "On the Control and Properties of Supercoiled Polymer Artificial Muscles," IEEE Transactions on Robotics 2017 (11 pages).

alibaba.com, "Hangzhou Phase Change Technology Co., Ltd", Retrieved from the Internet: <https://hzfeijie.en.alibaba.com/product/1448845650-220286736/phase_change_material_PCM_balls.html#!>, [Retrieved May 2, 2017] (3 pages).

Goodfellow Corporation, "New to Our Range: A Magnetic Shape Memory Alloy that Converts Magnetic Field Energy into Kinetic Energy," <retrieved from the Internet: http://www.goodfellowusa.com/corporate/news/US/June-2011/us.htm> [retrieved Jan. 23, 2012] (2 pages).

Goodfellow Corporation, "Magnetic Shape Memory Material", <retrieved from the Internet: http://www.goodfellowusa.com/larger-quantities/alloys/magnetic-shape-memory-material/> [retrieved Jan. 23, 2012] (3 pages).

Sherrit et al., "Planar Rotary Motor using Ultrasonic Horns", Proc. SPIE 7981, Sensors and Smart Structures Technologies for Civil, Mechanical, and Aerospace Systems 2011, 79810O, Apr. 13, 2011 (8 pages).

Henry, "Dynamic Actuation Properties of Ni—Mn—Ga Ferromagnetic Shape Memory Alloys", submitted to the Massachusetts Institute of Technology Department of Materials Science and Engineering on May 22, 2002, images on pp. 64-66 (202 pages).

Zhu et al., U.S. Appl. No. 18/433,896, filed Feb. 6, 2024.

Rowe et al., U.S. Appl. No. 18/468,029, filed Sep. 15, 2023.

Zhu et al., U.S. Appl. No. 18/399,075, filed Dec. 28, 2023.

Rowe et al., U.S. Appl. No. 18/178,302, filed Mar. 3, 2023.

Rowe et al., U.S. Appl. No. 18/399,026, filed Dec. 28, 2023.

Ou et al., "jamSheets: Thin Interfaces with Tunable Stiffness Enabled by Layer Jamming," Proceedings of the 8th International Conference on Tangible, Embedded, and Embodied Interaction, 2014 (8 pages).

Ou et al., "aeroMorph—Heat-sealing Inflatable Shape-change Materials for Interaction Design," Proceedings of the 29th Annual Symposium on User Interface Software and Technology (2016) pp. 121-132 (10 pages).

Song et al., "Resistance Modelling of SMA Wire Actuators", Canadian Institute for NDE, International Workshop: Smart Materials, Structures & NDT in Aerospace Conference, Nov. 2011 (10 pages).

Rowe et al., U.S. Appl. No. 18/452,602, filed Aug. 21, 2023.

Motzki, "Efficient SMA Actuation—Design and Control Concepts", Proceedings, vol. 64, No. 1, MDPI, 2020 (9 pages).

Arduino Documentation, "Secrets of Arduino PWM", last revision May 27, 2024, retrieved from the Internet: <https://docs.arduino.cc/tutorials/generic/secrets-of-arduino-pwm/>, [retrieved Jun. 1, 2024] (13 pages).

Spiess, "#321 7 Sensors tested: Measuring Current with Microcontrollers (Arduino, ESP32, ESP8266)", uploaded on Apr. 5, 2020 by user "Andreas Spiess" accessible via the Internet: <https://www.youtube.com/watch?v=cG8moaufmQs>.

International Search Authorithy, International Search Report and Written Opinion for International Application No. PCT/US2024/042739 mailed on Nov. 28, 2024, 2024 (12 pages).

\* cited by examiner

400

Causing an Actuator to Morph into an Activated Configuration
410

Monitoring a State of a Shape Memory Material Member of the Actuator
420

Controlling the Activated State of the Actuator Based on the Monitored State of the Shape Memory Material Member
430

FIG. 4

MONITORING A STATE OF A SHAPE MEMORY MATERIAL MEMBER

FIELD

The subject matter described herein relates in general to actuators and, more particularly, to shape memory material-based actuators.

BACKGROUND

Some motor vehicles have actuators in one or more portions of a vehicle seat. These actuators can provide a haptic effect to a seat occupant. Such an effect can provide support and/or comfort to a seat occupant.

SUMMARY

In one respect, the present disclosure is directed to a system. The system can include an actuator. When activated, the actuator can be configured to morph into an activated configuration in which a dimension of the actuator increases. The actuator can include a shape memory material member. The system can include a sensor configured to acquire sensor data. A portion of the shape memory material member can operatively engage the sensor. The system can include one or more processors operatively connected to monitor a state of the shape memory material member based on the sensor data.

In another respect, the present disclosure is directed to a method of monitoring a state of a shape memory material member used in an actuator. A portion of the shape memory material member can operatively engage a sensor. The method can include causing the actuator to morph into an activated configuration. The method can include monitoring a state of the shape memory material member using sensor data acquired by the sensor. The method can include controlling an activated state of the actuator based on the acquired sensor data.

BRIEF DESCRIPTION OF THE DRAWINGS

FIG. 4 is an example of a method of monitoring a state of a shape memory material member.

DETAILED DESCRIPTION

Some actuators used in vehicles used shape memory alloys for actuation. Shape memory alloys can be prone to overstress and/or overheating, which can lead to a reduced life and/or effectiveness of the actuators. Accordingly, arrangements described herein are directed to monitoring the state of a shape memory material member. Such monitoring can be based on sensor data from a sensor that is operatively engaged by the shape memory material member. The state of the shape memory material member can be controlled based on the sensor data.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

Figure 1:
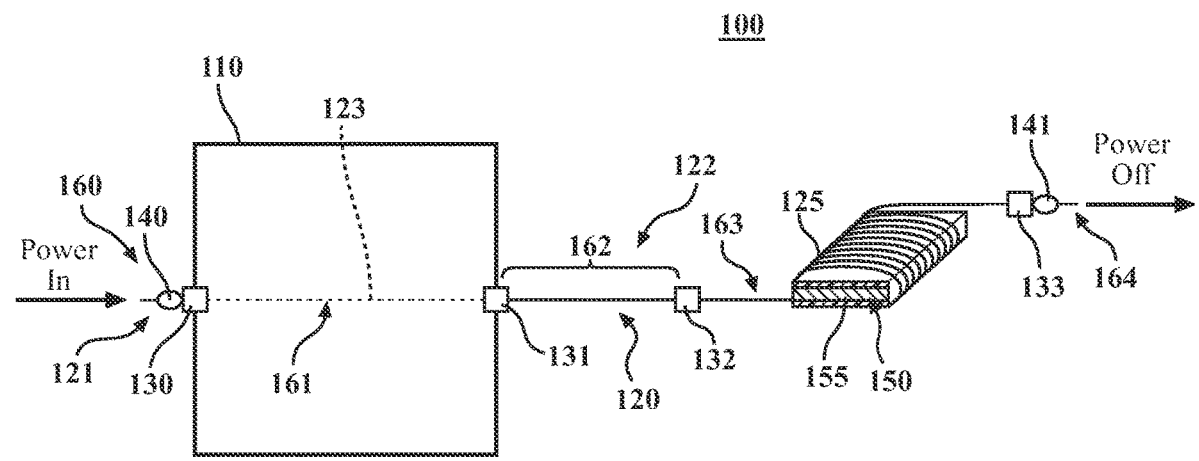
FIG. 1 shows an example of a system for monitoring a state of a shape memory material member.

FIG. 1 shows an example of a system 100 for monitoring a state of a shape memory material member. The system 100 can include an actuator 110. The actuator 110 is represented generally as there are various suitable actuators that can work with arrangements herein. When activated, the actuator is configured to morph into an activated configuration in which a dimension (e.g., a height) of the actuator increases.

The actuator 110 can be a shape memory material based actuator. Thus, the actuator 110 can include a shape memory material member 120. When an activation input is provided to the memory material member 120, the memory material member 120 can contract, thereby causing the actuator to morph into an activated configuration in which a dimension height of the actuator increases. In some arrangements, the contracting member can be a shape memory material member, which can include shape memory alloys and shape memory polymer. As an example, the contracting member can be a shape memory alloy wire. Various non-limiting examples of suitable actuators are shown in FIGS. 6-9, and they will be described in greater detail herein.

The phrase "shape memory material" includes materials that changes shape when an activation input is provided to the shape memory material and, when the activation input is discontinued, the material substantially returns to its original shape. Examples of shape memory materials include shape memory alloys (SMA) and shape memory polymers (SMP).

In one or more arrangements, the shape memory material members can be shape memory material wires. As an example, the shape memory material members can be shape memory alloy wires. Thus, when an activation input (i.e., heat) is provided to the shape memory alloy wire(s), the wire(s) can contract. Shape memory alloy wire(s) can be heated in any suitable manner, now known or later developed. For instance, shape memory alloy wire(s) can be heated by the Joule effect by passing electrical current through the wires. In some instances, arrangements can provide for cooling of the shape memory alloy wire(s), if desired, to facilitate the return of the wire(s) to a non-activated configuration. Of course, it will be appreciated that the activation input can be provided to the shape memory alloy wire(s) in other ways. For example, heated air can be blown on the shape memory alloy wire(s).

The wire(s) can have any suitable characteristics. For instance, the wire(s) can be high temperature wires with austenite finish temperatures from about 80 degrees Celsius to about 110 degrees Celsius. The wire(s) can have any suitable diameter. For instance, the wire(s) can be from about 0.2 millimeters (mm) to about 0.7 mm, from about 0.3 mm to about 0.5 mm, or from about 0.375 millimeters to about 0.5 millimeters in diameter. In some arrangements, the wire(s) can have a stiffness of up to about 70 gigapascals. The pulling force of SMA wire(s) can be from about 150 MPA to about 400 MPa. The wire(s) can be configured to provide an initial moment of from about 300 to about 600

N·mm, or greater than about 500 N·mm, where the unit of newton millimeter (N·mm) is a unit of torque (also called moment) in the SI system. One newton meter is equal to the torque resulting from a force of one newton applied perpendicularly to the end of a moment arm that is one meter long. In various aspects, the wire(s) can be configured to transform in phase, causing the shape memory material members to be moved from non-activated position to an activated position in about 3 seconds or less, about 2 seconds or less, about 1 second or less, or about 0.5 second or less.

The wire(s) can be made of any suitable shape memory material, now known or later developed. Different materials can be used to achieve various balances, characteristics, properties, and/or qualities. As an example, an SMA wire can include nickel-titanium (Ni—Ti, or nitinol). One example of a nickel-titanium shape memory alloy is FLEXINOL, which is available from Dynaolloy, Inc., Irvine, California. As a further example, the SMA wires can be made of Cu—Al—Ni, Fe—Mn—Si, or Cu—Zn—Al.

The SMA wire can be configured to increase or decrease in length upon changing phase, for example, by being heated to a phase transition temperature TSMA. Utilization of the intrinsic property of SMA wires can be accomplished by using heat, for example, via the passing of an electric current through the SMA wire in order provide heat generated by electrical resistance, in order to change a phase or crystal structure transformation (i.e., twinned martensite, detwinned martensite, and austenite) resulting in a lengthening or shortening the SMA wire. In some implementations, during the phase change, the SMA wire can experience a decrease in length of from about 2 to about 8 percent, or from about 3 percent to about 6 percent, and in certain aspects, about 3.5 percent, when heated from a temperature less than the TSMA to a temperature greater than the TSMA.

The SMA wire can have a critical temperature. Once the critical temperature is reached, the SMA wire cannot produce any more force. Thus, if the SMA wire is heated above the critical temperature, it cannot produce any more force. This inherent property of the SMA wire can be leveraged according to arrangements described herein.

Other active materials may be used in connection with the arrangements described herein. For example, other shape memory materials may be employed. Shape memory materials, a class of active materials, also sometimes referred to as smart materials, include materials or compositions that have the ability to remember their original shape, which can subsequently be recalled by applying an external stimulus, such as an activation signal.

While the shape memory material members are described, in some implementations, as being wires, it will be understood that the shape memory material members are not limited to being wires. Indeed, it is envisioned that suitable shape memory materials may be employed in a variety of other forms, such as sheets, plates, panels, strips, cables, tubes, or combinations thereof. In some arrangements, the shape memory material members may include an insulating coating.

In some arrangements, the actuator 110 can include a single shape memory material member 120. In some instances, one or more portions of the shape memory material member 120 can extend external to overall envelope of the actuator 110. For instance, the shape memory material member 120 can include a first external portion 121 and a second external portion 122. Further, a portion of the shape memory material member 120 can extend within the actuator 110. Thus, the shape memory material member 120 can include an internal portion 123.

One example of the routing of the shape memory material member 120 will now be described with respect to FIG. 1. Beginning of the left side of FIG. 1, there can be the first external portion 121 of the shape memory material member 120. The shape memory material member 120 can then be routed with respect to the actuator 110. For instance, in some arrangements, the shape memory material member 120 can extend substantially linearly within the actuator 110. In other arrangements, the shape memory material member 120 can extend in a non-linear manner, such as in a serpentine or a zig-zag arrangement. The shape memory material member 120 can exit the actuator 110. This portion is the second external portion 122. In the second external portion, the of the shape memory material member 120 can operatively engage a sensor 150, as will be described in more detail in FIG. 2.

The shape memory material member 120 can be activated and/or deactivated using any suitable form of energy and/or from any suitable source. For example, in some arrangements, the of the shape memory material member 120 can be operatively connected to a power source (e.g., the power source(s) 340 in FIG. 3). In one or more arrangements, the first external portion 121 can be operatively connected to receive electrical energy (e.g., power in). For instance, the shape memory material member 120 can be operatively connected to a power source at an electrical connection 140. In one or more arrangements, the second external portion 122 can be operatively connected for electrical energy to exit the system 100 (e.g., power out). For instance, the shape memory material member 120 can be operatively connected to a power source at electrical connection 141.

However, it will be appreciated that arrangements described herein are not limited to activating and/or deactivating the shape memory material member 120 based on electrical energy. Indeed, as an example, the shape memory material member 120 can be activated and/or by supplying hot air, such as from a heater or some other heat source, to the shape memory material member 120. The heater can be operatively positioned with respect to the shape memory material member 120.

The shape memory material member can have a plurality of mechanically isolated zones. Each of the mechanically isolated zones does not affect the other mechanically isolated zones. The shape memory material member can be electrically connected throughout its routing. However, if the shape memory material member contracts or expands, then such contraction or expansion occurs through all of the mechanically isolated zones.

The mechanically isolated zones can be defined by a plurality of isolation points. In the example shown in FIG. 1, there can be four isolation points, including a first isolation point 130, a second isolation point 131, a third isolation point 132, and a fourth isolation point 133. The isolation points 130, 131, 132, 133 can be defined in any suitable manner. For instance, the isolation points 130, 131, 132, 133 can be locations where the shape memory material member 120 is crimped.

The isolation points 130, 131, 132, 133 can create a plurality of mechanically isolated zones, including a first mechanically isolated zone 160, a second mechanically isolated zone 161, a third mechanically isolated zone 162, a fourth mechanically isolated zone 163, and a fifth mechanically isolated zone 164. Each of these mechanically isolated zones will be described in turn below.

The first mechanically isolated zone 160 can be defined by the first isolation point 130. The first mechanically isolated zone can include the first external portion 121 of the shape memory material member 120. The first isolation point 130 can be located at or near where the shape memory material member 120 enters the actuator.

The second mechanically isolated zone 161 can be defined between the first isolation point 130 and the second isolation point 131. The second mechanically isolated 161 zone can be largely, if not entirely, defined by the portion of the shape memory material member 120 routed within the actuator 110.

The third mechanically isolated zone 162 can be defined between the second isolation point 131 and the third isolation point 132. The third mechanically isolated zone 162 can be a free floating zone where the shape memory material member 120 does not engage another structure.

The fourth mechanically isolated zone 163 can be defined between the third isolation point 132 and the fourth isolation point 133. The fourth mechanically isolated zone 163 can be monitored by a sensors. The fourth mechanically isolated zone 163 can be where the shape memory material member 120 operatively engages the sensor 150. Additional details of this area will be described in greater detail with FIG. 2.

The fifth mechanically isolated zone 164 can be define by the fourth isolation point 133 and beyond. The fifth mechanically isolated zone 164 can include the second external portion 122 of the shape memory material member 120. The fourth isolation point 133 can be located at or near where the shape memory material member 120 exits the actuator 110.

Figure 2:
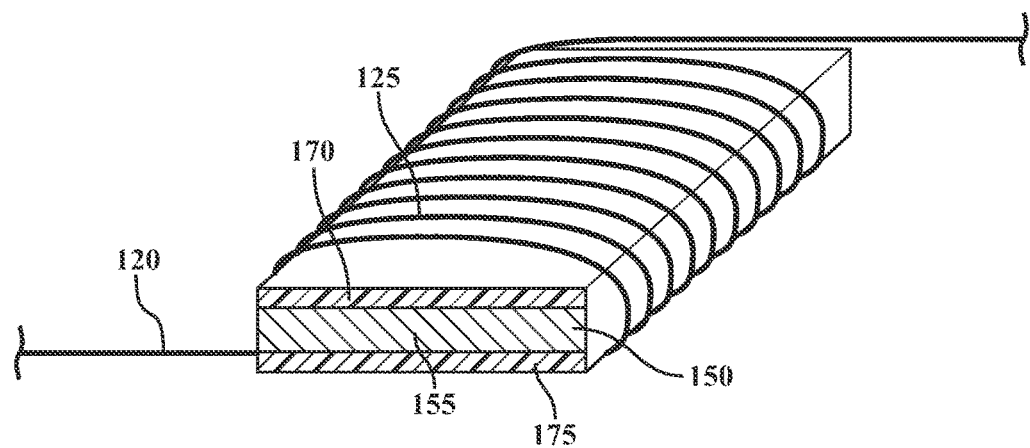
FIG. 2 is a close-up of a portion of the system of FIG. 1.

Referring to FIG. 2, a close-up of a portion of the system 100 of FIG. 1 is shown. In particular, an example of the operative engagement between the sensor 150 and the shape memory material member 120 is shown. "Operative engagement" refers to an arrangement in which the activation and/or deactivation of the shape memory material member affects the sensor 150.

As noted above, the sensor 150 can be a force sensitive resistive sensor 155. The force sensitive resistive sensor 155 can be a relatively thin and/or substantially flat structure. In one or more arrangements, the shape memory material member can be wrapped around the sensor 150. Thus, when the shape memory material member 120 contracts in response to an activation input (e.g., electrical energy), it can exert a force on the sensor 150. The force sensitive resistive sensor 155 can be a resistor that changes its resistance when a force, pressure, or mechanical stress is applied. The resistance depends on how much force, pressure, or mechanical stress is applied. The resistance is proportional to the force, pressure, or mechanical stress is applied being applied to it.

The shape memory material member 120 can be wrapped around the sensor 150 one or more times. Thus, the shape memory material members 120 can be coiled about the sensor 150 to form one or more coils 125.

In some arrangements, one or more structures can be used in connection with the sensor 150 to provide protection thereto. As an example, a first protective member 170 can be operatively connected to one side of the sensor 150. Alternatively or additionally, a second protective member 175 can be operatively connected to an opposite side of the sensor 150. The first protective member 170 and the second protective member 175 can be sized, shaped, and configured to protect the sensor 150 while not interfering with its operation.

Figure 3:
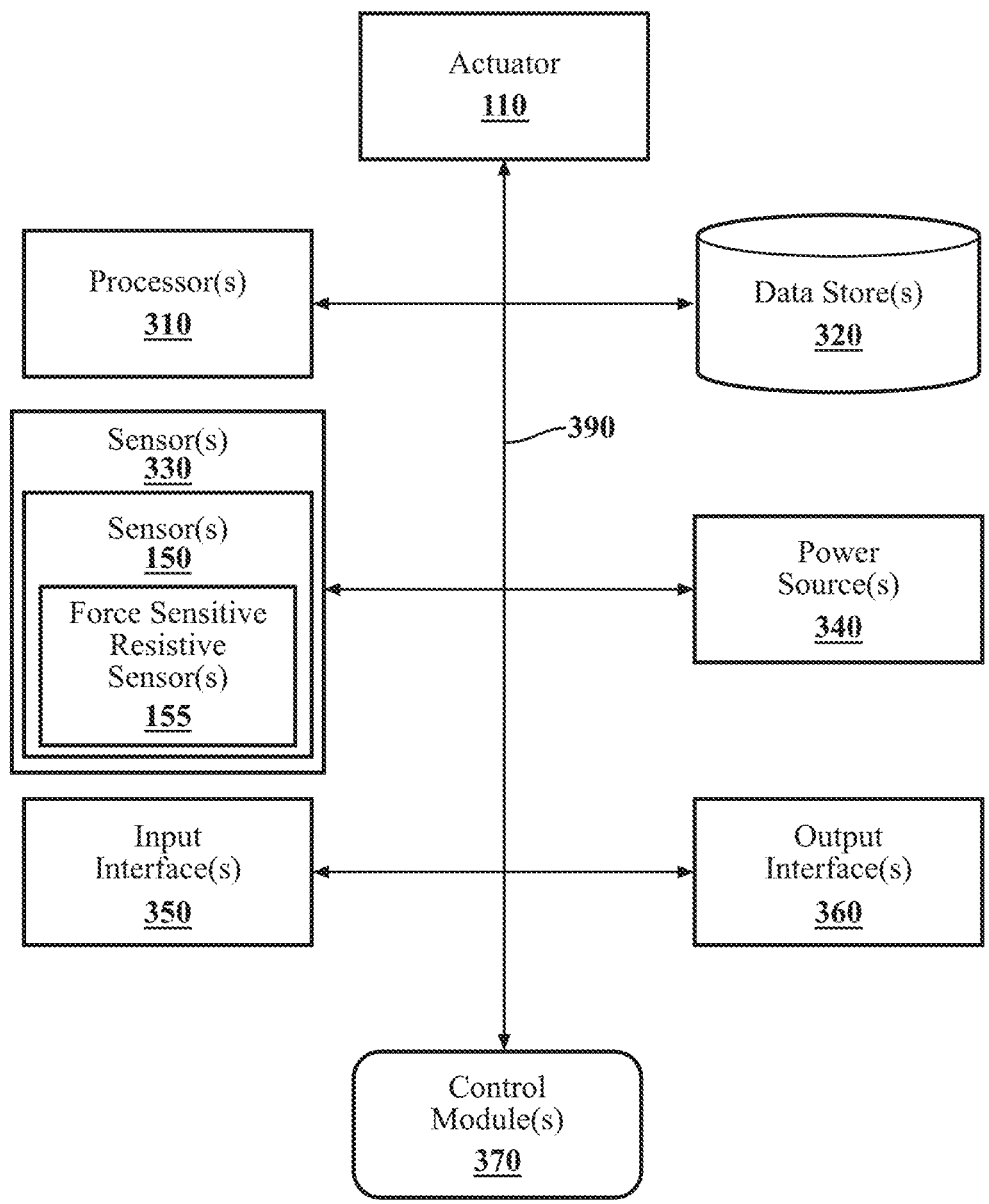
FIG. 3 is an example of a system for monitoring a state of a shape memory material member.

Referring to FIG. 3, an example of a system 300 for monitoring a state of a shape memory material member is shown. The system 300 can include various elements. Some of the possible elements of the system 300 are shown in FIG. 3 and will now be described. It will be understood that it is not necessary for the system 300 to have all of the elements shown in FIG. 3 or described herein. The system 300 can have any combination of the various elements shown in FIG. 3. Further, the system 300 can have additional elements to those shown in FIG. 3. In some arrangements, the system 300 may not include one or more of the elements shown in FIG. 3. Further, the elements shown may be physically separated by large distances. Indeed, one or more of the elements can be located remotely from the other elements, such an on a remote server or cloud-based server.

In addition to the actuator 110, the system 300 can include one or more processors 310, one or more data stores 320, one or more sensors 330, one or more power sources 340, one or more input interfaces 350, one or more output interfaces 360, and/or one or more control modules 370. Each of these elements will be described in turn below.

As noted above, the system 300 can include one or more processors 310. "Processor" means any component or group of components that are configured to execute any of the processes described herein or any form of instructions to carry out such processes or cause such processes to be performed. The processor(s) 310 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 310 can include at least one hardware circuit (e.g., an integrated circuit) configured to carry out instructions contained in program code. In arrangements in which there is a plurality of processors 310, such processors can work independently from each other or one or more processors can work in combination with each other.

The system 300 can include one or more data stores 320 for storing one or more types of data. The data store(s) 320 can include volatile and/or non-volatile memory. Examples of suitable data stores 320 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 320 can be a component of the processor(s) 310, or the data store(s) 320 can be operatively connected to the processor(s) 310 for use thereby. The term "operatively connected," as used throughout this description, can include direct or indirect connections, including connections without direct physical contact.

The system 300 can include one or more sensors 330. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the system 300 includes a plurality of sensors 330, the sensors can work independently from each other. Alternatively, two or more of the sensors can work in combination with each other. In such case, the two or more sensors can form a sensor network. The sensor(s) 330 can be operatively connected to the processor(s) 310, the data store(s) 320, and/or other elements of the system 300 (including any of the elements shown in FIG. 1).

The sensor(s) 330 can include the sensor 150 (e.g., the force sensitive resistive sensor 155) described in connection with FIG. 1 above. In addition, the sensor(s) 330 can include any suitable type of sensor, now known or later developed, that can acquire information or data about the actuator 110, the shape memory material member 120, or any other portion or component of the system 100 of FIG. 1 or the system of FIG. 2.

As noted above, the system 300 can include one or more power sources 340. The power source(s) 340 can be any power source capable of and/or configured to energize the actuator 110, as will be described later. For example, the power source(s) 340 can include one or more batteries, one or more fuel cells, one or more generators, one or more alternators, one or more solar cells, and combinations thereof. The power source(s) 340 can be any suitable source of electrical energy.

The system 300 can include one or more input interfaces 350. An "input interface" includes any device, component, system, element or arrangement or groups thereof that enable information/data to be entered into a machine. The input interface(s) 350 can receive an input from a vehicle occupant (e.g., a driver or a passenger). Any suitable input interface 350 can be used, including, for example, a keypad, gesture recognition interface, voice recognition interface, display, touch screen, multi-touch screen, button, joystick, mouse, trackball, microphone and/or combinations thereof.

The system 300 can include one or more output interfaces 360. An "output interface" includes any device, component, system, element or arrangement or groups thereof that enable information/data to be presented to a vehicle occupant (e.g., a person, a vehicle occupant, etc.). The output interface(s) 360 can present information/data to a vehicle occupant. The output interface(s) 360 can include a display. Alternatively or in addition, the output interface(s) 360 may include an earphone and/or speaker. Some components of the system 300 may serve as both a component of the input interface(s) 350 and a component of the output interface(s) 360.

The system 300 can include one or more modules, at least some of which will be described herein. The modules can be implemented as computer readable program code that, when executed by a processor, implements one or more of the various processes described herein. One or more of the modules can be a component of the processor(s) 310, or one or more of the modules can be executed on and/or distributed among other processing systems to which the processor(s) 310 is operatively connected. The modules can include instructions (e.g., program logic) executable by one or more processor(s) 310. Alternatively or in addition, one or more data stores 320 may contain such instructions. In some arrangements, the module(s) can be located remote from the other elements of the system 300.

In one or more arrangements, the modules described herein can include artificial or computational intelligence elements, e.g., neural network, fuzzy logic or other machine learning algorithms. Further, in one or more arrangements, the modules can be distributed among a plurality of modules. In one or more arrangements, two or more of the modules described herein can be combined into a single module.

The system 300 can include one or more control modules 370. The control module(s) 370 can include profiles and logic for controlling the actuator 110. The control module(s) 370 can use profiles, parameters, or settings loaded into the control module(s) 370 and/or stored in the data store(s) 320, such as the actuation profiles. In some arrangements, the control module(s) 370 can be located remotely from the other elements of the system 300, such as on a remote server, a cloud-based server, or an edge server.

The control module(s) 370 can be configured to cause one or more of the actuators 110 to be activated or deactivated. As used herein, "cause" or "causing" means to make, force, compel, direct, command, instruct, and/or enable an event or action to occur or at least be in a state where such event or action may occur, either in a direct or indirect manner. For instance, the control module(s) 370 can cause the actuator 110 to be selectively activated or deactivated in any suitable manner. For instance, when the actuator 110 includes a shape memory material member 120, the shape memory material member 120 can be heated by the Joule effect by passing electrical current through the shape memory material member. To that end, the control module(s) 370 can be configured to selectively permit, restrict, adjust, alter, and/or prevent the flow of electrical energy from the power source(s) 340 to the shape memory material member 120 of the actuator 110. The control module(s) 370 can be configured to send control signals or commands over a communication network 390 to one or more elements of the system 300.

The control module(s) 370 can be configured to cause the actuator 110 to be activated or deactivated based on various events, conditions, inputs, or other factors. For instance, the control module(s) 370 can be configured to cause the actuator 110 to be activated or deactivated based on a user input. A user can provide an input on the input interface(s) 350.

In some arrangements, the control module(s) 370 can be configured to cause the actuator 110 to be activated or deactivated. In some instances, the control module(s) 370 can be configured to adjust the degree of activation of the actuator 110. For instance, the control module(s) 370 can be configured to cause the actuator 110 to be in an activated configuration that corresponds to its full activated position (e.g., extended to its maximum height). The control module(s) 370 can be configured to activate the actuator 110 to one or more activated configurations between the non-activated configuration and the full activated configuration, such as an extended position but less than its maximum height. The control module(s) 370 can be configured to maintain the activated configuration of the actuator 110. The control module(s) 370 can be configured to adjust the activated configuration of the actuator 110.

The control module(s) 370 can be configured to receive sensor data from the sensor 150. The control module(s) 370 can be configured to analyze the sensor data. For instance, when the sensor is a force sensitive resistive sensor 155, the control module(s) 370 can be configured to detect changes in the resistance of or measured by the force sensitive resistive sensor 155.

As noted above, the resistance of the force sensitive resistive sensor 155 will stop changing once the critical temperature is reached, even if the shape memory material member 120 is heated beyond the critical temperature. Thus, once the resistance of the force sensitive resistive sensor 155 stops changing, then the control module(s) 370 can recognize that the shape memory material member has reached its critical temperature and that the actuator 110 is at its maximum activated configuration.

The actual value of the resistance of the force sensitive resistive sensor 155 does not have to be known. Rather, the control module(s) 370 only needs to monitor the changes in electrical resistance. When the control module(s) 370 detect that the resistance is no longer changing, the control module(s) 370 can be configured to take one or more actions. For instance, the control module(s) 370 can discontinue the supply of electrical energy to the shape memory material member 120. Alternatively, the control module(s) 370 can maintain the current state of the actuator 110. Thus, additional power is not supplied to the shape memory material member 120. In this way, extra power is not supplied to the to the shape memory material member 120 and, therefore, is not wasted.

It will be appreciated that arrangements described herein are not limited to force sensitive resistive sensor or to monitoring changes in resistance. Indeed, arrangements described herein can be configured to monitor the state of the shape memory material member 120 based on any sensor data. Such monitoring can be based on any parameter, characteristic, or metric. The control module(s) 370 can be configured to determine when at least one metric is fulfilled based on feedback from one or more of the sensor(s) 150.

The various elements of the system 300 can be communicatively linked to one another or one or more other elements through one or more communication networks 390. As used herein, the term "communicatively linked" can include direct or indirect connections through a communication channel, bus, pathway or another component or system. A "communication network" means one or more components designed to transmit and/or receive information from one source to another. The data store(s) 320 and/or one or more other elements of the system 300 can include and/or execute suitable communication software, which enables the various elements to communicate with each other through the communication network and perform the functions disclosed herein.

The one or more communication networks 390 can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network 390 further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network 390 can include wired communication links and/or wireless communication links. The communication network 390 can include any combination of the above networks and/or other types of networks.

Now that the various potential systems, devices, elements and/or components of the system 300 have been described, various methods will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Turning to FIG. 4, an example of a method 400 of monitoring a state of a shape memory material member. is shown. At block 410, the actuator 110 can be caused to morph into an activated configuration. Such causing can be performed by the processor(s) 310 and/or the control module(s) 370. For instance, the processor(s) 310 and/or the control module(s) 370 can cause electrical energy from the power source(s) 340 to be supplied to the plurality of actuators 110. More particularly, the processor(s) 310 and/or the control module(s) 370 can cause electrical energy from the power source(s) 340 to be supplied to the shape memory material member 120 of the actuator 110. As a result, the shape memory material member 120 can contract, which morphs the actuator 110 into the activated configuration where a height of the actuator 110 can increase. The causing can be performed automatically, in response to a user input (e.g., provided on the input interface(s) 350), or in any other suitable way. The method 400 can continue to block 420.

At block 420, a state of the shape memory material member 120 can be monitored. The monitoring can be performed by the control module(s) 370 and/or the processor(s) 310 based on sensor data acquired by the sensor 150 (e.g., the force sensitive resistive sensor 155). In one or more arrangements, the control module(s) 370 and/or the processor(s) 310 can monitor for changes in the resistance of and/or measured by the sensor 150. In one particular arrangement, the control module(s) 370 and/or the processor(s) 310 can monitor when the resistance of and/or measured by the sensor 150 stops changing. The method 400 can continue to block 430.

At block 430, the activated configuration of the actuator 110 can be controlled based on the monitored state of the shape memory material member 120. The controlling can be performed by the control module(s) 370 and/or the processor(s) 310. As an example, when the resistance of and/or measured by the sensor 150 stops changing, the control module(s) 370 and/or the processor(s) 310 can cause the supply of electrical energy to the shape memory material member 120 to be discontinued. As another example, when the resistance of and/or measured by the sensor 150 stops changing, the control module(s) 370 can maintain the current state of the actuator 110. Thus, the control module(s) 370 and/or the processor(s) 310 can cause the supply of electrical energy to the shape memory material member 120 to be maintained at the current level.

As noted above, the resistance of the force sensitive resistive sensor 155 will stop changing once the critical temperature is reached, even if the shape memory material member 120 is heated beyond the critical temperature. Thus, once the resistance of the force sensitive resistive sensor 155 stops changing, then the control module(s) 370 can recognize that the shape memory material member has reached its critical temperature and that the actuator 110 is at its maximum activated configuration.

The actual value of the resistance of the force sensitive resistive sensor 155 does not have to be known. Rather, the control module(s) 370 only needs to monitor the changes in electrical resistance. When the control module(s) 370 detects that the resistance is no longer changing, the control module(s) 370 can be configured to take one or more actions. For instance, the control module(s) 370 can discontinue the supply of electrical energy to the shape memory material member 120. Alternatively, the control module(s) 370 can maintain the current state of the actuator 110. Thus, additional power is not supplied to the shape memory material member 120. In this way, extra power is not supplied to the to the shape memory material member 120 and, therefore, is not wasted.

The method 400 can end. Alternatively, the method 400 can return to block 410 or to some other block. The method 400 can be repeated at any suitable point, such as at a suitable time or upon the occurrence of any suitable event or condition.

As noted above, arrangements described herein can be used in connection there can be a plurality of actuators. The actuators can be substantially identical to each other. Alternatively, one or more of the actuators can be different from the other actuators in one or more respects. FIGS. 5-8 show some non-limiting examples of suitable actuators.

Figure 5A:
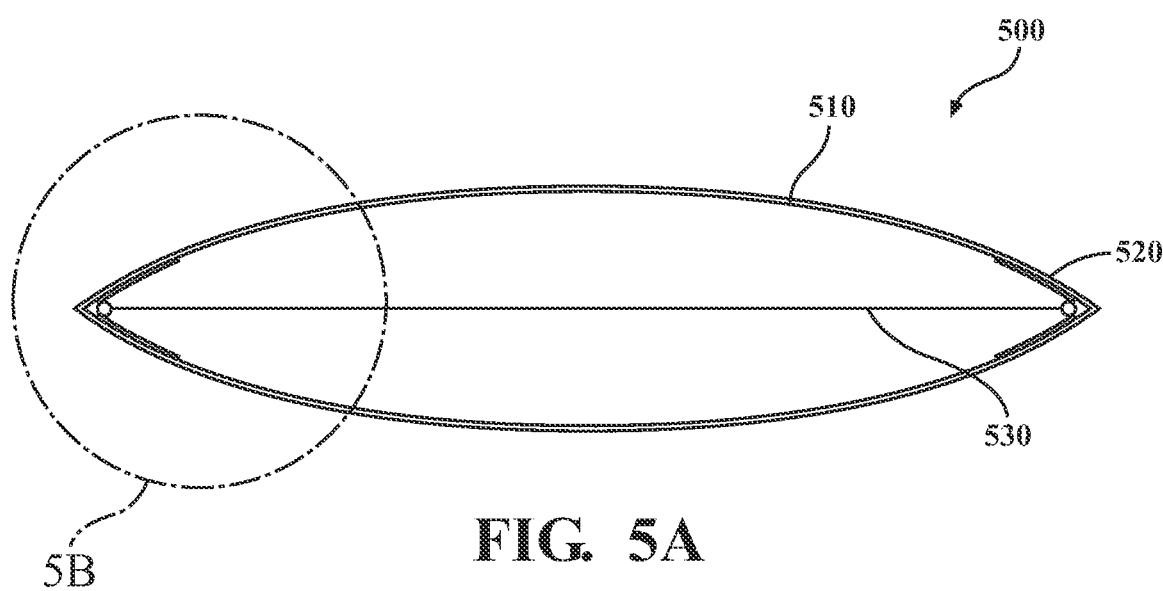
FIG. 5A-5C is a first example of an actuator.
Figure 5B:
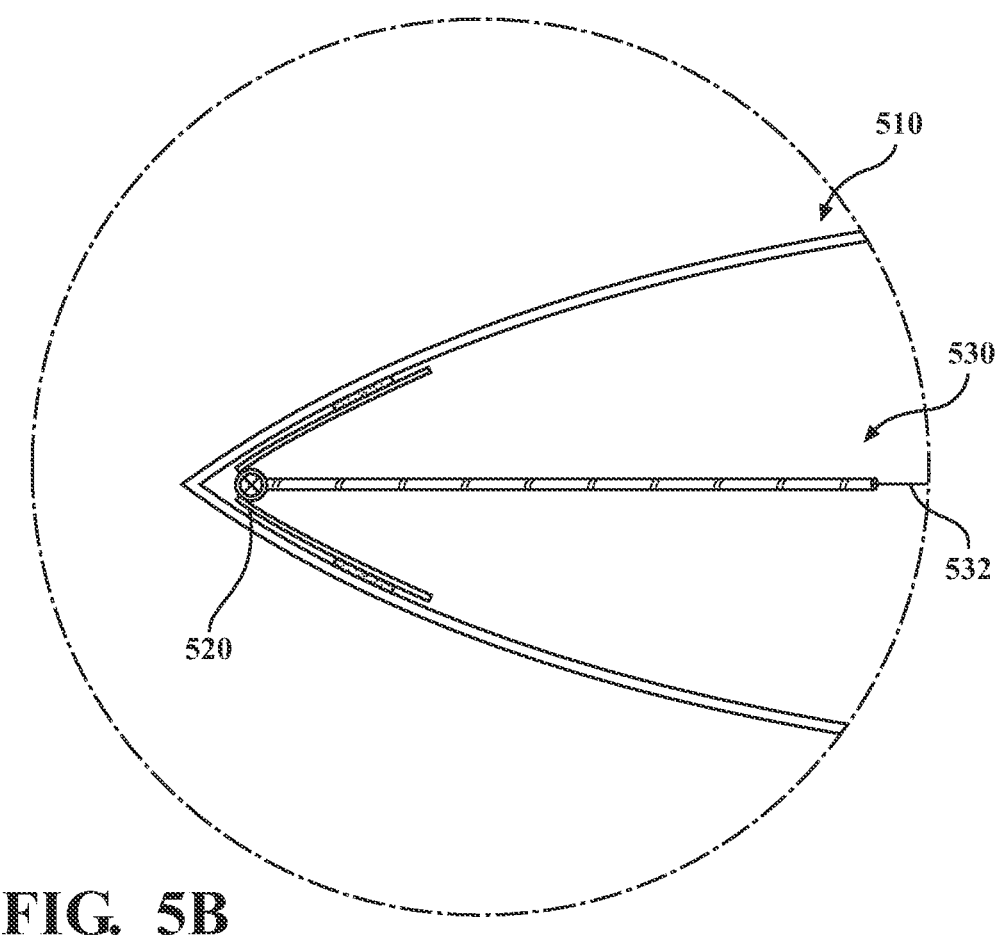
Figure 5C:
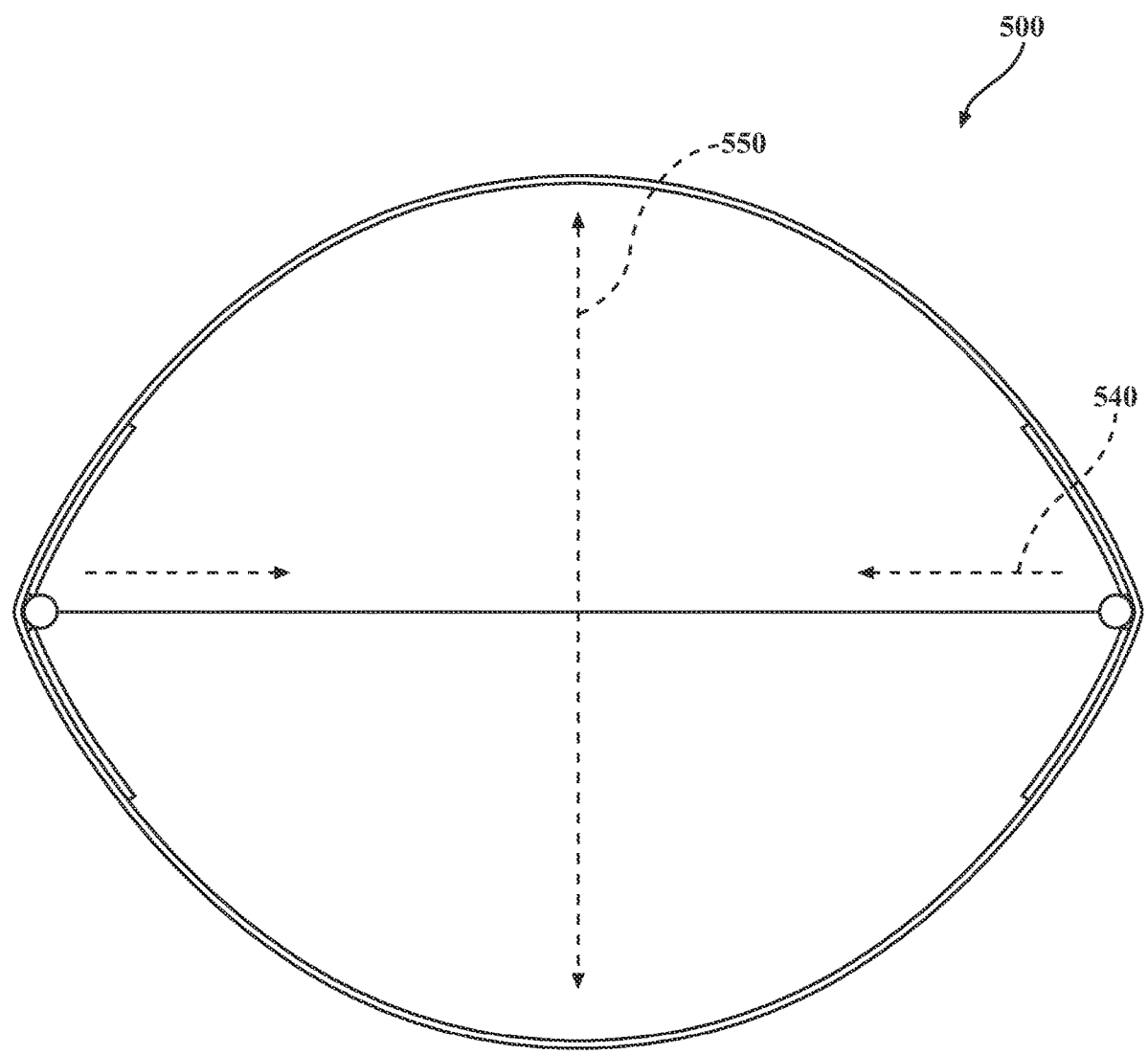

FIGS. 5A-5C show one example of an actuator 500 suitable for use in connection with arrangements described herein. The basic details of the actuator 500 will now be described. Additional details of the actuator 500 are described in U.S. Pat. No. 10,960,793, which is incorporated herein by reference in its entirety.

The actuator 500 is depicted here with an outer skin 510, hinge assemblies 520, and an input-responsive element 530. The actuator 600 can have a first dimension 540 and a second dimension 550.

The input-responsive element 530 can include one or more elements capable of transitioning from a first configuration to a second configuration. The transition of the input-responsive element 530 from the first configuration to the second configuration displaces the hinge assemblies 520 with respect to the outer skin 510 and causes a change in confirmation of the outer skin 510. In some implementations, the input-responsive element 530 can include a SMM wire 532. The SMM wire 532 can be a shape memory alloy.

FIG. 5A shows an example of the actuator 500 in a non-activated configuration. When heated, the SMM wire 532 can contract, causing the hinge assemblies 520 to move toward one another. As a result, the actuator 500 can morph from a non-activated configuration to an activated configuration as shown in FIG. 5C. In the activated configuration, the second dimension 550 of the actuator can increase, and the first dimension 540 of the actuator 500 can decrease.

Figure 6A:
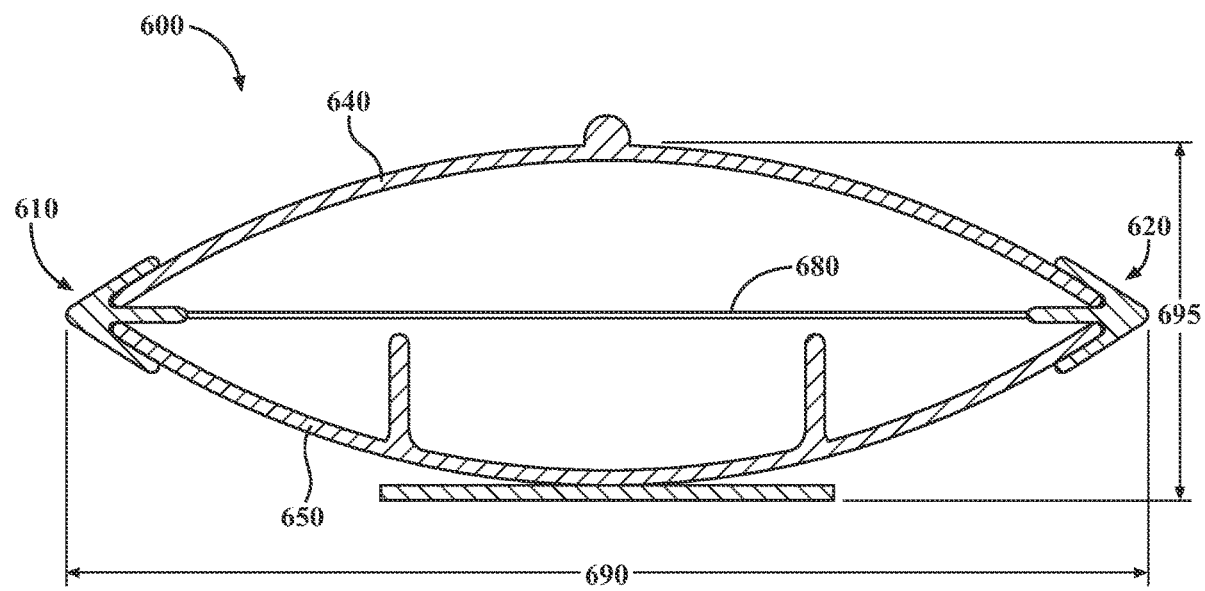
FIGS. 6A-6B is a second example of an actuator.
Figure 6B:
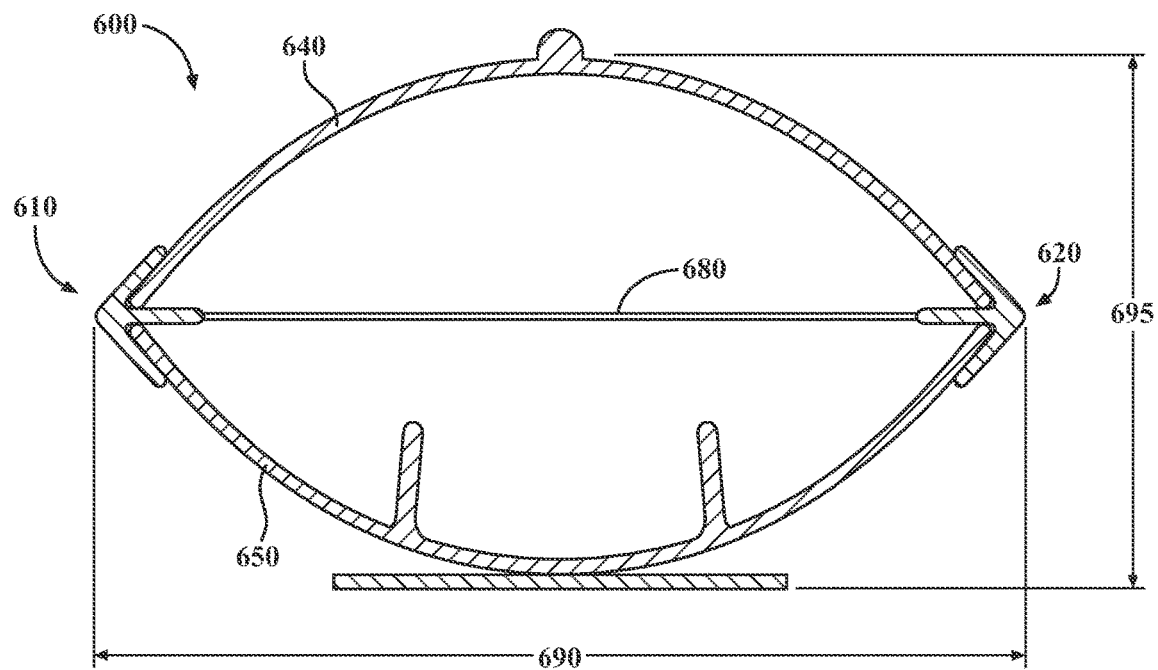

FIGS. 6A-6B show another example of an actuator 600 suitable for use in connection with arrangements described herein. The basic details of the actuator 600 will now be described. Additional details of the actuator 600 are described in U.S. patent application Ser. No. 17/729,522, which is incorporated herein by reference. FIG. 6A shows an example of the actuator 600 in a non-activated condition, and FIG. 6B shows an example of the actuator 600 in an activated condition.

The actuator 600 can include a first endcap 610 and a second endcap 620. The first endcap 610 and the second endcap 620 can be spaced apart. The actuator 600 can include a first outer member 640 and a second outer member 650. The first outer member 640 and the second outer member 650 can have a bowed shape.

The actuator 600 can include one or more shape memory material members 680. The shape memory material members 680 can be operatively connected to the first endcap 610 and the second endcap 620. The phrase "shape memory material" includes materials that changes shape when an activation input is provided to the shape memory material and, when the activation input is discontinued, the material substantially returns to its original shape. Examples of shape memory materials include shape memory alloys (SMA) and shape memory polymers (SMP).

In one or more arrangements, the shape memory material members 680 can be shape memory material wires. As an example, the shape memory material members 680 can be shape memory alloy wires. Thus, when an activation input (i.e., heat) is provided to the shape memory alloy wire(s), the wire(s) can contract. Shape memory alloy wire(s) can be heated in any suitable manner, now known or later developed. For instance, shape memory alloy wire(s) can be heated by the Joule effect by passing electrical current through the wires. In some instances, arrangements can provide for cooling of the shape memory alloy wire(s), if desired, to facilitate the return of the wire(s) to a non-activated configuration.

As noted above, FIG. 6B is an example of the actuator 600 in an activated condition. When an activation input (e.g., electrical energy) is provided to the shape memory material member(s) 680, the shape memory material member(s) 680 can contract. This contraction causes the shape memory material member(s) 680 to pull the first endcap 610 and the second endcap 620 toward each other in a direction that corresponds to the first dimension 690.

Consequently, the ends of the first outer member 640 can be drawn toward each other in a direction that corresponds to the first dimension 690, and the ends of the second outer member 650 can be drawn toward each other in a direction that corresponds to the first dimension 690. As a result, the first outer member 640 and the second outer member 650 can bow outward and away from each other in a direction that corresponds to the second dimension 695. It will be appreciated that the first dimension 690 (i.e., the width) of the actuator 600 can decrease, and the second dimension 695 (i.e., the height) of the actuator 600 can increase.

Figure 7A:
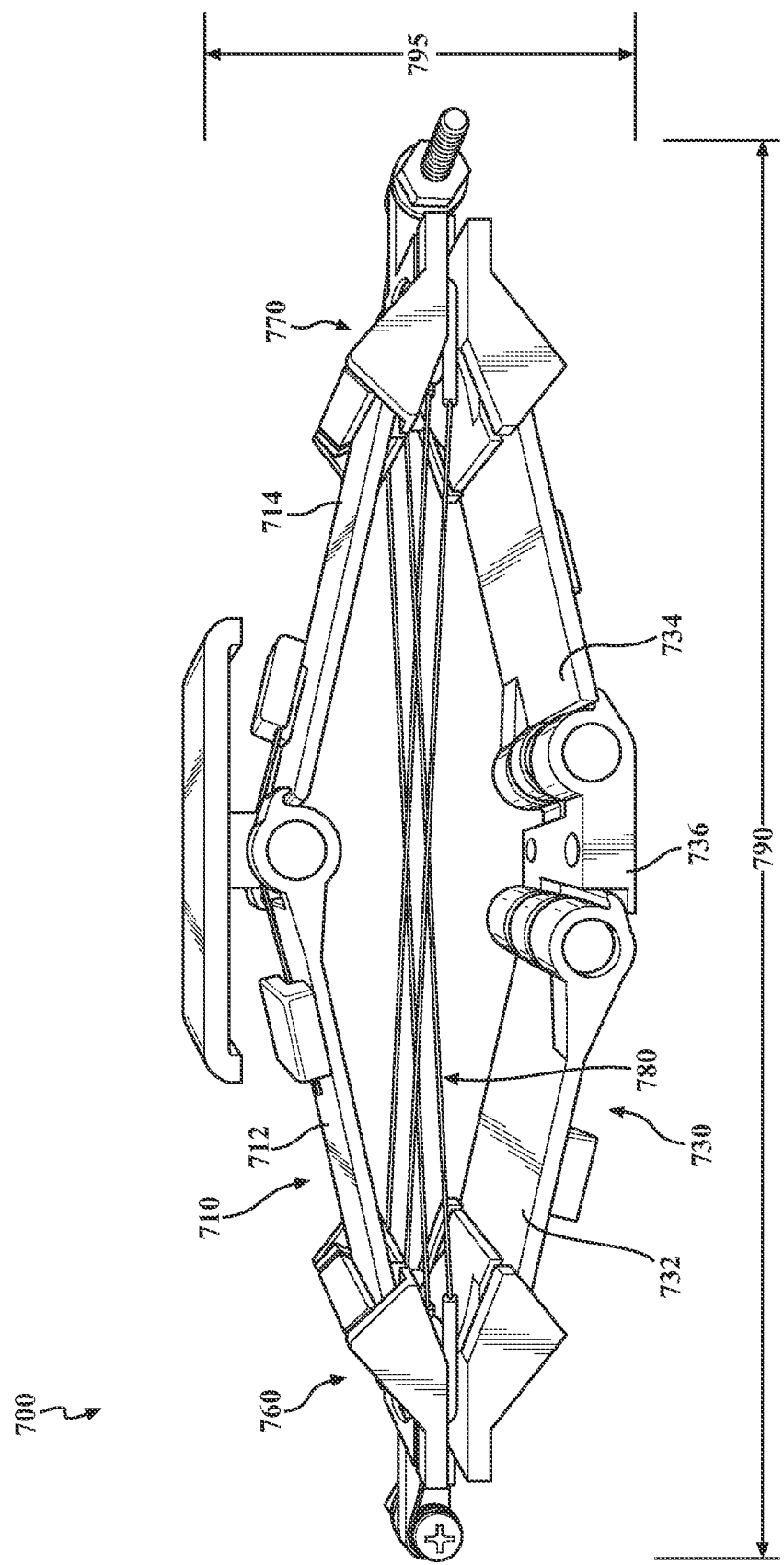
FIGS. 7A-7B is a third example of an actuator.
Figure 7B:
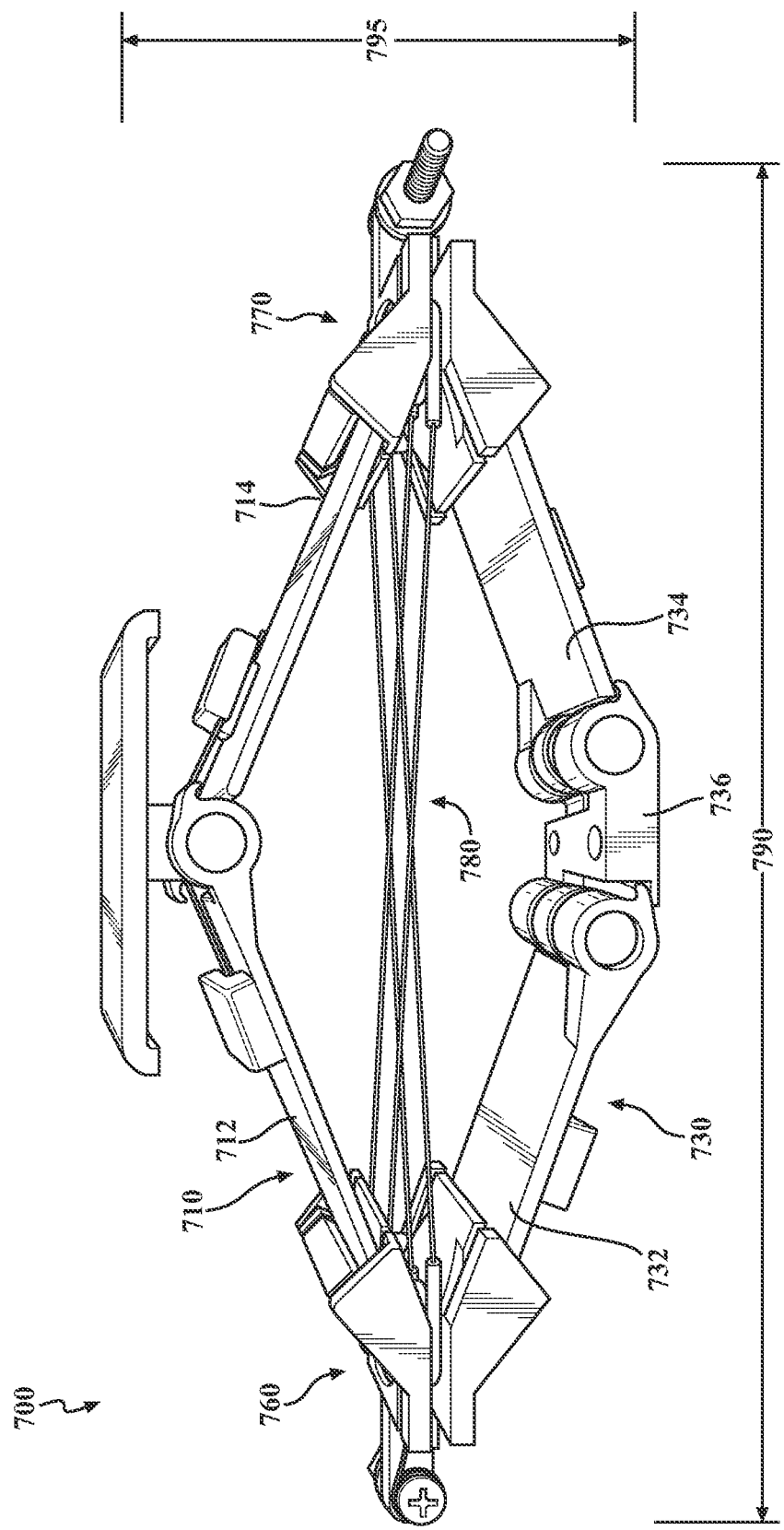

FIGS. 7A-7B show one example of an actuator 700 suitable for use according to arrangements herein. The basic details of the actuator 700 will now be described. Additional details of the actuator 700 are described in U.S. patent application Ser. No. 18/329,217, which is incorporated herein by reference.

The actuator 700 can include a first outer body member 710, a second outer body member 730, a first endcap 760, a second endcap 770, and a shape memory material member 780. The first outer body member 710 can include a first portion 712 and a second portion 714. The first portion 712 and the second portion 714 can be operatively connected to each other such that the first portion 712 and the second portion 714 can move relative to each other. In one or more arrangements, the first portion 712 and the second portion 714 can be pivotably connected to each other. For example, the first portion 712 and the second portion 714 can be pivotably connected to each other by one or more hinges. The first portion 712 and the second portion 714 can be angled relative to each other. As a result, the first outer body member 710 can have a generally V-shape.

The second outer body member 730 can include a first portion 732, a second portion 734, and a base 736. In one or more arrangements, each of the first portion 732 and the second portion 734 can be pivotably connected to the base 736. For example, the first portion 732 can be pivotably connected to the base 736 by one or more hinges, and the second portion 734 can be pivotably connected to the base 736 by one or more hinges. The first portion 732 and the second portion 734 can be located on opposite sides of the base 736.

The actuator 700 can include a first endcap 760 and a second endcap 770. The first endcap 760 and the second endcap 770 can be spaced apart. The actuator 700 can include one or more shape memory material members 780. The shape memory material member(s) 780 can extend between the first endcap 760 and the second endcap 770 in any suitable manner. The shape memory material member(s) 780 can be operatively connected to the first endcap 760 and the second endcap 770.

FIG. 7A shows an example of the actuator 700 in a non-activated configuration. Here, the shape memory material member(s) 780 are not activated. FIG. 7B shows an example of the actuator 700 in an activated configuration. When an activation input (e.g., electrical energy) is provided to the shape memory material member(s) 780, the shape memory material member(s) 780 can contract. This contraction causes the shape memory material member(s) 780 to pull the first endcap 760 and the second endcap 770 toward each other in a direction that corresponds to a first dimension 790. As a result, the first outer body member 710 and the second outer body member 730 can extend outward and away from each other in a direction that corresponds to a second dimension 795. It will be appreciated that, in going from the non-activated condition to the activated condition, the first dimension 790 (i.e., the width) of the actuator 700 can decrease and/or the second dimension 795 (i.e., the height) of the actuator 700 can increase. Further, it will be appreciated that the actuator 700 can deliver a force in a direction that is out of plane or otherwise different from the direction of contraction of the shape memory material member(s) 780.

Figure 8:
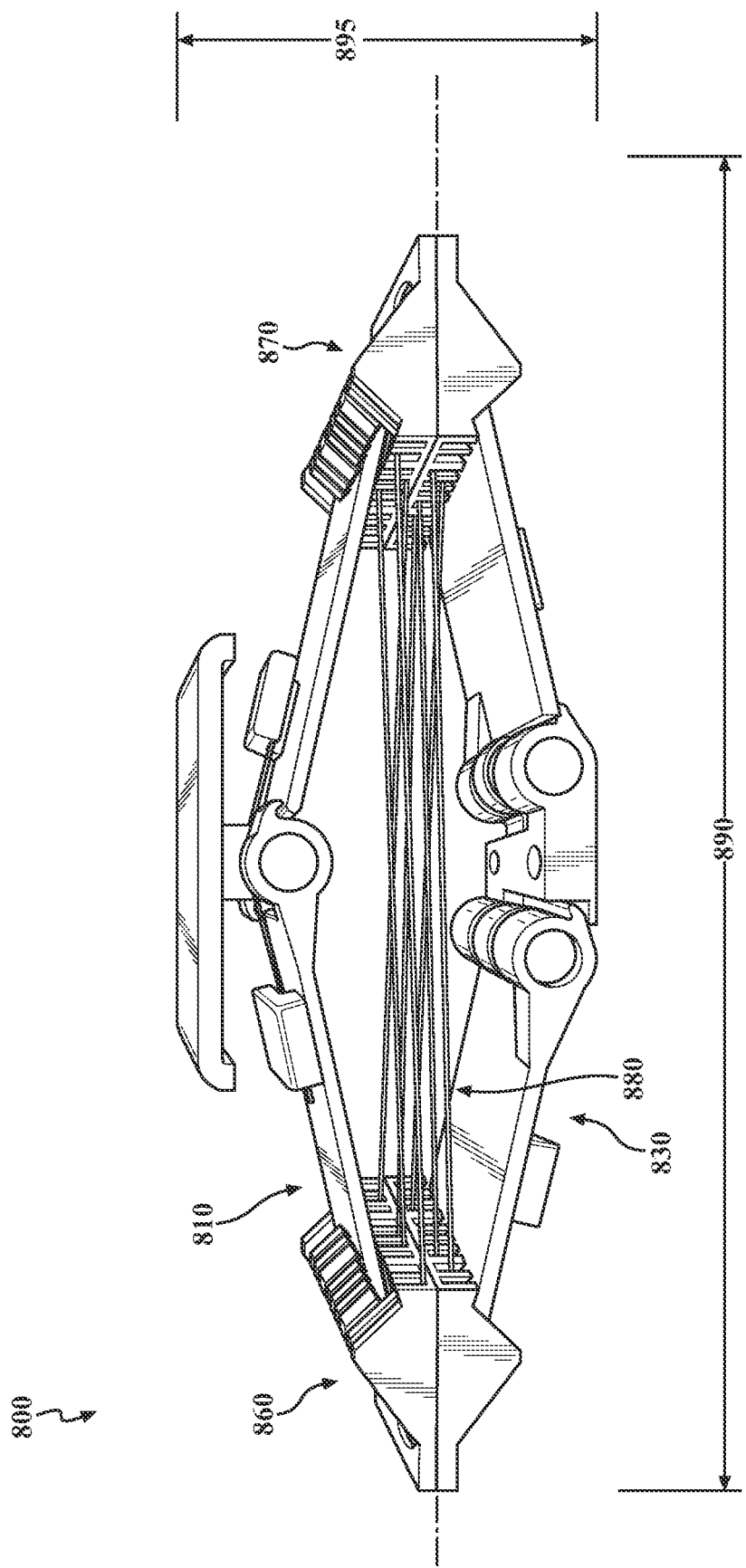
FIG. 8 is a fourth example of an actuator.

FIG. 8 shows one example of an actuator 800 suitable for use according to arrangements herein. The basic details of the actuator 800 will now be described. Additional details of the actuator 800 are described in U.S. patent application Ser. No. 18/329,217, which is incorporated herein by reference.

The actuator 800 can include a first outer body member 810, a second outer body member 830, and one or more shape memory material members 880. The actuator 800 includes a first endcap 860 and a second endcap 870. The first endcap 860 and the second endcap 870 shown in FIG. 8 are different than the first endcap 760 and the second endcap 770 shown in FIGS. 7A-7B.

FIG. 8 shows an example of the actuator 800 in a non-activated configuration. Here, the shape memory material member(s) 880 are not activated. When an activation input (e.g., electrical energy) is provided to the shape memory material member(s) 880, the shape memory material member(s) 880 can contract. This contraction causes the shape memory material member(s) 880 to pull the first endcap 860 and the second endcap 870 toward each other in a direction that corresponds to the first dimension 890. As a result, the first outer body member 810 and the second outer body member 830 can extend outward and away from each other in a direction that corresponds to the second dimension 895. It will be appreciated that, in going from the non-activated condition to the activated condition, the first dimension 890 (i.e., the width) of the actuator 800 can decrease and/or the second dimension 895 (i.e., the height) of the actuator 800 can increase.

The various examples of actuators shown in FIGS. 5-8 are merely examples and are not intended to be limiting. Other actuators are described in U.S. Patent Publication Nos. 2023/0191953 and 2023/0136197 as well as U.S. Pat. Nos. 11,370,330; 11,285,844; and 11,091,060, which are incorporated herein by reference in their entireties.

Arrangements described herein can be used in any application in which shape memory material-based actuators are used. For instance, arrangements described herein can be used in connection with seat actuators or other actuators in a vehicle. "Vehicle" means any form of transport, including motorized or powered transport. In one or more implementations, the vehicle can be an automobile. While arrangements will be described herein with respect to automobiles, it will be understood that embodiments are not limited to automobiles. In some implementations, the vehicle may be a watercraft, an aircraft, spacecraft, or any other form of transport. However, it will be appreciated that arrangements described herein are not limited to vehicular applications. For instance, arrangements described herein can be used in connection with an office chair, a chair, a massage chair, a gaming chair, a recliner, or any other seat structure, now known or later developed. Of course, arrangements are not limited to seat applications.

It will be appreciated that arrangements described herein can provide numerous benefits, including one or more of the benefits mentioned herein. For example, arrangements described herein can enable indirect measurement of the maximum actuated state of a shape memory material member. Arrangements described herein can enable such indirect measurement using inexpensive sensors. Arrangements described herein do not require calibration. Arrangements described herein can protect shape memory material members from overheating and/or overstressing. Arrangements described herein can help to maximize the useful life of a shape memory material member. Arrangements described herein can facilitate improved actuator performance.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
   an actuator configured to morph, when activated, into an activated configuration in which a dimension of the actuator increases, the actuator including a shape memory material member;
   a sensor configured to acquire sensor data, a portion of the shape memory material member operatively engaging the sensor, the shape memory material member including an external portion that extends external to the actuator; and
   one or more processors operatively connected to monitor a state of the shape memory material member based on the sensor data.

2. The system of claim 1, wherein the portion of the shape memory material member that extends external to the actuator operatively engages the sensor.

3. The system of claim 2, wherein the external portion of the shape memory material member is wrapped around the sensor, whereby, when the shape memory material member contracts, a characteristic of the sensor changes.

4. The system of claim 3, wherein the sensor is a force sensitive resistive sensor.

5. The system of claim 3, further including one or more protective members operatively connected to the sensor, whereby the protective members protect the sensor from the shape memory material member.

6. The system of claim 1, wherein the shape memory material member is a shape memory alloy.

7. The system of claim 1, wherein the shape memory material member is a wire.

8. The system of claim 1, wherein the one or more processors are configured to:
   control the state of the shape memory material member using the sensor data.

9. A system, comprising:
   an actuator configured to morph, when activated, into an activated configuration in which a dimension of the actuator increases, the actuator including a shape memory material member;
   a sensor configured to acquire sensor data, a portion of the shape memory material member operatively engaging the sensor; and
   one or more processors operatively connected to monitor a state of the shape memory material member based on the sensor data by monitoring changes in a resistance of the sensor.

10. A system, comprising:
    an actuator configured to morph, when activated, into an activated configuration in which a dimension of the actuator increases, the actuator including a shape memory material member;
    a sensor configured to acquire sensor data, a portion of the shape memory material member operatively engaging the sensor; and
    one or more processors operatively connected to monitor a state of the shape memory material member based on the sensor data,
    when at least one metric is fulfilled based on the sensor data, the one or more processors being configured to discontinue a supply of energy to the shape memory material member.

11. A system, comprising:
    an actuator configured to morph, when activated, into an activated configuration in which a dimension of the actuator increases, the actuator including a shape memory material member;
    a sensor configured to acquire sensor data, a portion of the shape memory material member operatively engaging the sensor; and
    one or more processors operatively connected to monitor a state of the shape memory material member based on the sensor data, when at least one metric is fulfilled based on the sensor data, the one or more processors being configured to substantially maintain a supply of energy to the shape memory material member at a current level.

12. A system, comprising:
an actuator configured to morph, when activated, into an activated configuration in which a dimension of the actuator increases, the actuator including a shape memory material member, the shape memory material member includes including a plurality of mechanically isolated zones defined by a plurality of isolation points along the shape memory material member;
a sensor configured to acquire sensor data, a portion of the shape memory material member operatively engaging the sensor in one of the plurality of mechanically isolated zones that is external to the actuator; and
one or more processors operatively connected to monitor a state of the shape memory material member based on the sensor data.

13. The system of claim 12, wherein the plurality of isolation points are areas where the shape memory material member is crimped.

14. A method of monitoring a state of a shape memory material member used in an actuator, a portion of the shape memory material member being wrapped around a sensor to operatively engage the sensor, the method comprising:
causing the actuator to morph into an activated configuration;
monitoring a state of the shape memory material member using sensor data from the sensor; and
controlling an activated state of the actuator based on the sensor data.

15. A method of monitoring a state of a shape memory material member used in an actuator, a portion of the shape memory material member operatively engaging a force sensitive resistive sensor, the method comprising:
causing the actuator to morph into an activated configuration;
monitoring a state of the shape memory material member using sensor data from the force sensitive resistive sensor, the monitoring including monitoring changes in a resistance of the force sensitive resistive sensor; and
controlling an activated state of the actuator based on the sensor data.

16. The method of claim 14, wherein controlling an activated state of the actuator based on the sensor data includes:
discontinuing a supply of energy to the shape memory material member when at least one metric is fulfilled based on the sensor data.

17. The method of claim 14, wherein controlling an activated state of the actuator based on the sensor data includes:
substantially maintaining a supply of electrical energy to the shape memory material member when at least one metric is fulfilled based on the sensor data.

18. A method of monitoring a state of a shape memory material member used in an actuator, a portion of the shape memory material member operatively engaging a sensor, the method comprising:
causing the actuator to morph into an activated configuration by activating the shape memory material member;
monitoring a state of the shape memory material member using sensor data from the sensor; and
when at least one metric is fulfilled based on the sensor data, one of:
discontinuing a supply of energy to the shape memory material member; or
maintaining a supply of energy to the shape memory material member at a current level.

* * * * *

UNITED STATES PATENT AND TRADEMARK OFFICE
CERTIFICATE OF CORRECTION

PATENT NO. : 12,234,811 B1
APPLICATION NO. : 18/452602
DATED : February 25, 2025
INVENTOR(S) : Michael Paul Rowe et al.

It is certified that error appears in the above-identified patent and that said Letters Patent is hereby corrected as shown below:

In the Claims

Column 17, Line 10, Claim 12: delete "member includes including" and insert --member including--

Signed and Sealed this
Twenty-fifth Day of March, 2025

Coke Morgan Stewart
*Acting Director of the United States Patent and Trademark Office*